US012750493B2

(12) United States Patent
He et al.

(10) Patent No.: US 12,750,493 B2
(45) Date of Patent: Sep. 29, 2026

(54) CIRCULAR-SHIFT TRANSFORMATION FOR IMAGE AND VIDEO CODING

(71) Applicant: Google LLC, Mountain View, CA (US)

(72) Inventors: Dake He, Waterloo (CA); Daan He, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/878,617

(22) PCT Filed: Jun. 27, 2022

(86) PCT No.: PCT/US2022/035160
§ 371 (c)(1),
(2) Date: Dec. 23, 2024

(87) PCT Pub. No.: WO2024/005777
PCT Pub. Date: Jan. 4, 2024

(65) Prior Publication Data

US 2025/0392725 A1 Dec. 25, 2025

(51) Int. Cl.
*H04N 19/147* (2014.01)
*H04N 19/176* (2014.01)
(Continued)

(52) U.S. Cl.
CPC ......... *H04N 19/147* (2014.11); *H04N 19/176* (2014.11); *H04N 19/192* (2014.11); *H04N 19/61* (2014.11)

(58) Field of Classification Search
CPC ............... H04N 19/147; H04N 19/176; H04N 19/192; H04N 19/61
See application file for complete search history.

(56) References Cited

U.S. PATENT DOCUMENTS

| | | | | |
|---|---|---|---|---|
| 2004/0150747 A1* | 8/2004 | Sita | ...................... | H04N 19/132 375/E7.113 |
| 2023/0262262 A1* | 8/2023 | Bruls | ................... | H04N 19/132 348/43 |
| 2023/0345021 A1* | 10/2023 | Wang | ................... | H04N 19/423 |

OTHER PUBLICATIONS

Yi-xiong (Video coding using geometry based block partitioning and reordering discrete cosine transform—Yi-xiong Zhang†1, Jiang-hong Shi1, Wei-dong Wang2—Revision accepted Nov. 28, 2011—doi:10.1631/jzus.C1100218—Journal of Zhejiang University—Science C (Computers & Electronics) ISSN 1869-1951 (Year: 2012).*

(Continued)

*Primary Examiner* — Nasim N Nirjhar
(74) *Attorney, Agent, or Firm* — Young Basile Hanlon & MacFarlane, P.C.

(57) ABSTRACT

Image coding using circular-shift transformation includes generating a reconstructed image by obtaining a circular-shift indicator indicating that circular-shift transformation is enabled for a current block by decoding the circular-shift indicator from an encoded bitstream, obtaining quantized transform coefficients for the current block by entropy decoding the quantized transform coefficients from the encoded bitstream, obtaining circular-shift offsets for the current block by decoding the circular-shift offsets from the encoded bitstream, obtaining dequantized transform coefficients for the current block by dequantizing the quantized transform coefficients, obtaining reconstruction circular-shifted residual values for the current block by inverse transforming the dequantized transform coefficients, obtaining reconstruction residual values for the current block by inverse circular shifting the reconstruction circular-shifted residual values, generating prediction values for the current block, obtaining reconstructed pixels for the current block by combining the reconstruction residual values and the (Continued)

prediction values, and including the reconstructed pixel in the reconstructed image.

20 Claims, 14 Drawing Sheets

(51) Int. Cl.
*H04N 19/192* (2014.01)
*H04N 19/61* (2014.01)

(56) References Cited

OTHER PUBLICATIONS

A. Puri et al, "Video coding using the H.264/MPEG-4 AVC compression standard", Signal Processing: Image Compression (Elsevier Science Publishers, Amsterdam, NL), vol. 19, No. 9; Oct. 1, 2004, pp. 793-849.

J. Chen et al, "Algorithm description for Versatile Video Coding and Test Model 10 (VTM 10)", 19th Meeting: Jun. 22-Jul. 1, 2022, Joint Video Experts Team of ITU-T SG 16 and ISO/IEC JTC 1/SC 29/WG 11, No. JVET-S2002, 97 pgs.

Jiro Katto et al, "Denoising Intra-Coded Moving Pictures Using Motion Estimation and Pixel Shift", IEEE International Conference on Acoustics, Speech and Signal Processing (ICASSP) (Piscataway, NJ); Mar. 31, 2008, pp. 1393-1396.

Antoine Robert et al, "Improving DCT-Based Coders Through Block Oriented Transforms", Advanced Concepts for Intelligent Vision Systems Lecture Notes in Computer Science (Springer, Berlin, DE); Jan. 1, 2006, pp. 375-383.

International Search Report and Written Opinion of International Application No. PCT/US2022/035160 dated Feb. 8, 2023, 15 pgs.

* cited by examiner

X (1210)

| | | | |
|---|---|---|---|
| 11 | 1 | -3 | 9 |
| -11 | 18 | -4 | 13 |
| 7 | -3 | 8 | 15 |
| -5 | 9 | 11 | 18 |

DCT(X) →

Y (1220)

| | | | |
|---|---|---|---|
| 23.5000 | -15.5531 | 5.0000 | -11.4172 |
| -6.3879 | 11.3180 | 5.5489 | -5.1464 |
| 5.0000 | 2.3754 | 2.5000 | 4.4281 |
| 1.5636 | 5.8536 | 13.3963 | 17.6820 |

C-SHIFT(X, 3, 2) ↓

X' (1230)

| | | | |
|---|---|---|---|
| 11 | 18 | -5 | 9 |
| -3 | 9 | 11 | 1 |
| -4 | 13 | -11 | 18 |
| 8 | 15 | 7 | -3 |

DCT(X') →

Y' (1240)

| | | | |
|---|---|---|---|
| 23.5000 | 2.9245 | -5.0000 | -19.0708 |
| 2.2304 | 0.0888 | 3.2392 | -2.0784 |
| 6.5000 | 13.9567 | 0 | 2.3369 |
| 0.1585 | -3.5784 | 14.3530 | -17.5888 |

FIG. 12

1410

| | | | |
|---|---|---|---|
| 2.1776 | 15.761 | 0.65941 | 3.2589 |
| 0.93799 | 0.21423 | 0.34315 | 6.6512 |
| 18.058 | 0.17157 | 7.3372 | 0.041239 |
| 1.0469 | 5.5674 | 26.436 | 5.5354 |

dX1

1420

| | | | |
|---|---|---|---|
| 15.946 | 0.11314 | 22.933 | 2.3738 |
| 3.5489 | 0.30723 | 1.0136 | 5.4586 |
| 0.36262 | 6.7713 | 0.0046589 | 2.9839 |
| 6.8422 | 7.4262 | 0.89363 | 0.0029898 |

dX2

FIG. 14

CIRCULAR-SHIFT TRANSFORMATION FOR IMAGE AND VIDEO CODING

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using circular-shift transformation.

SUMMARY

This application relates to encoding and decoding of image data, video stream data, or both for transmission or storage. Disclosed herein are aspects of systems, methods, and apparatuses for encoding and decoding using circular-shift transformation for image and video coding.

An aspect is a method for circular-shift transformation for image and video coding. Circular-shift transformation for image and video coding may include generating a reconstructed image. Generating the reconstructed image using circular-shift transformation may include obtaining a circular-shift indicator indicating that circular-shift transformation is enabled for a current block by decoding the circular-shift indicator from an encoded bitstream, obtaining quantized transform coefficients for the current block by entropy decoding the quantized transform coefficients from the encoded bitstream, obtaining circular-shift offsets for the current block by decoding the circular-shift offsets from the encoded bitstream, obtaining dequantized transform coefficients for the current block by dequantizing the quantized transform coefficients, obtaining reconstruction circular-shifted residual values for the current block by inverse transforming the dequantized transform coefficients, obtaining reconstruction residual values for the current block by inverse circular shifting the reconstruction circular-shifted residual values, generating prediction values for the current block, obtaining reconstructed pixels for the current block by combining the reconstruction residual values and the prediction values, and including the reconstructed pixel in the reconstructed image. Circular-shift transformation for image and video coding may include outputting the reconstructed image.

Another aspect is a method for circular-shift transformation for image and video coding. Circular-shift transformation for image and video coding may include obtaining a current input block from a current input frame, generating a prediction block for the current block, obtaining a residual block by subtracting the prediction values from the current block, obtaining optimal circular-shift offsets by performing circular-shift optimization for the residual block. Circular-shift optimization may include obtaining a circular-shifted residual block by circular shifting the residual block in accordance with the optimal circular-shift offsets, obtaining a transform block by Discrete Cosine Transforming the circular-shifted residual block, and obtaining a quantized block by quantizing the transform block. Circular-shift transformation for image and video coding may include obtaining entropy coded data by entropy coding the quantized block, including the entropy coded data in an output bitstream, and outputting the output bitstream.

Another aspect is an apparatus for circular-shift transformation for image and video coding. The apparatus may include a processor configured to generate a reconstructed image using circular-shift transformation for image and video coding and output the reconstructed image. To generate the reconstructed image using circular-shift transformation for image and video coding the processor may execute instructions stored in a memory of the apparatus to obtain a circular-shift indicator indicating that circular-shift transformation is enabled for a current block by decoding the circular-shift indicator from an encoded bitstream, obtain quantized transform coefficients for the current block, wherein to obtain the quantized transform coefficients the processor may execute the instructions to entropy decode the quantized transform coefficients from the encoded bitstream, obtain circular-shift offsets for the current block, wherein to obtain the circular-shift offsets the processor may execute the instructions to decode the circular-shift offsets from the encoded bitstream, obtain dequantized transform coefficients for the current block, wherein to obtain the dequantized transform coefficients the processor may execute the instructions to dequantize the quantized transform coefficients, obtain reconstruction circular-shifted residual values for the current block, wherein to obtain the reconstruction circular-shifted residual values the processor may execute the instructions to inverse transform the dequantized transform coefficients, obtain reconstruction residual values for the current block, wherein to obtain the reconstruction residual values the processor may execute the instructions to inverse circular shifting the reconstruction circular-shifted residual values, generate prediction values for the current block, obtain reconstructed pixels for the current block, wherein to obtain the reconstructed pixels the processor may execute the instructions to combining the reconstruction residual values and the prediction values, and include the reconstructed pixel in the reconstructed image, and output the reconstructed image.

Another aspect is an apparatus for circular-shift transformation for image and video coding. The apparatus may include a processor configured to generate an encoded image using circular-shift transformation for image and video coding and output the encoded image in an output bitstream. To generate the encoded image using circular-shift transformation for image and video coding the processor may execute instructions stored in a memory of the apparatus to obtain a current input block from a current input frame, generate a prediction block for the current block, and obtain a residual block. To obtain the residual block the processor may execute the instructions to subtract the prediction values from the current block. To generate the encoded image using circular-shift transformation for image and video coding the processor may execute instructions stored in the memory to obtain optimal circular-shift offsets, wherein to obtain the optimal circular-shift offsets the processor executes the instructions to perform circular-shift optimization for the residual block. To perform circular-shift optimization the processor executes the instructions to obtain a circular-shifted residual block, wherein to obtain the circular-shifted residual block the processor executes the instructions to circular shift the residual block in accordance with the optimal circular-shift offsets, obtain a transform block, wherein to obtain the transform block the processor executes the instructions to Discrete Cosine Transform the circular-shifted residual block, and obtain a quantized block, wherein to obtain the quantized block the processor executes the instructions to quantize the transform block. To generate the encoded image using circular-shift transformation for image and video coding the processor may execute instructions stored in the memory to obtain entropy coded data, wherein to obtain the entropy coded data the processor executes the instructions to entropy code the quantized block, include the entropy coded data in an output bitstream, and output the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

FIG. 12 is a block diagram of an example for comparison of image and video coding using circular-shift transformation with image and video coding that omits using circular-shift transformation in accordance with implementations of this disclosure.

FIG. 14 is another block diagram of the example for comparison of image and video coding using circular-shift transformation with image and video coding that omits using circular-shift transformation in accordance with implementations of this disclosure.

DETAILED DESCRIPTION

Figure 1:
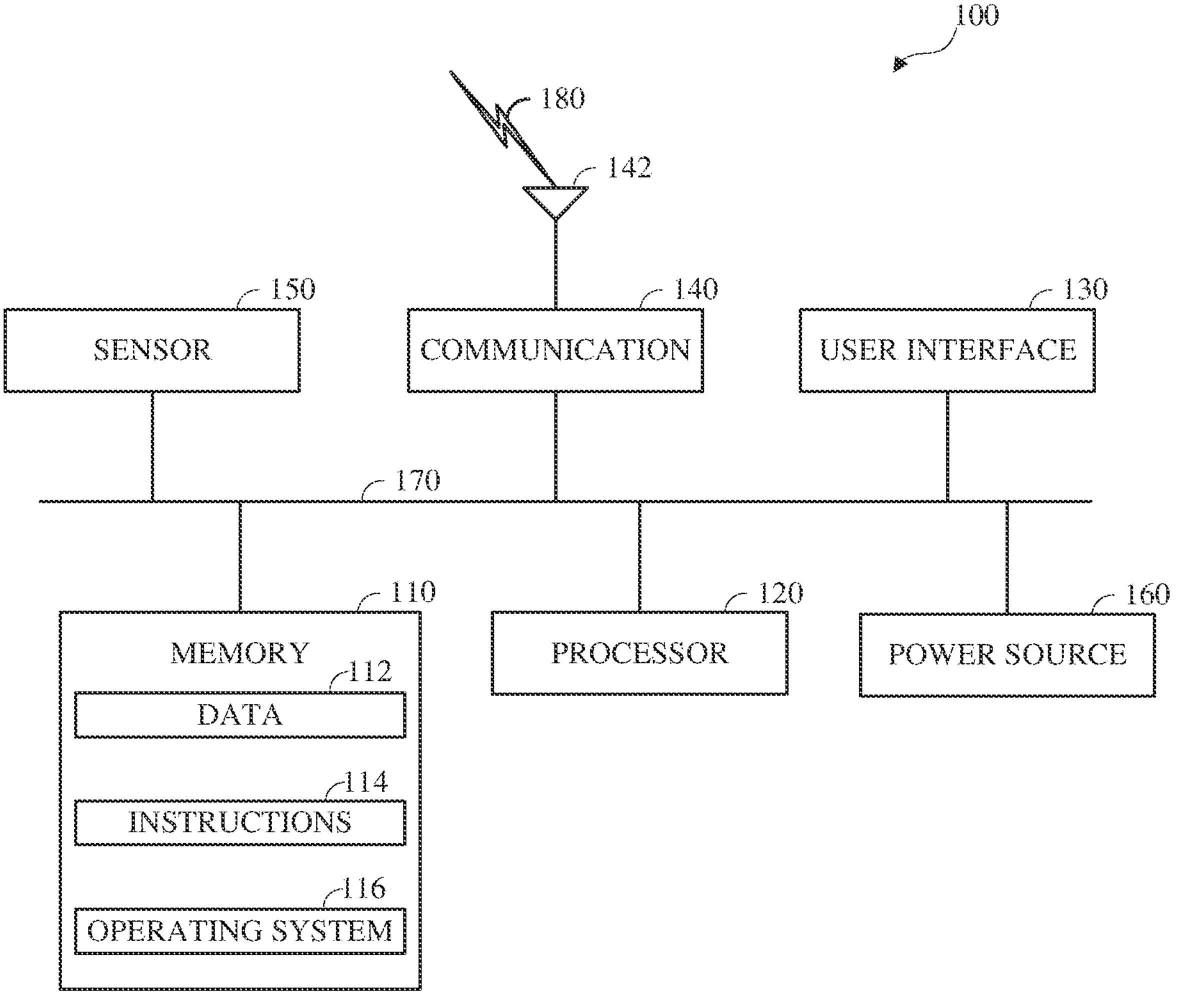
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients (e.g., energy compaction), quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to reconstruct the blocks and the source images from the limited information. In some implementations, the accuracy, efficiency, or both, of coding a block using either inter-prediction or intra-prediction may be limited.

Image and video compression schemes may implement block-based hybrid coding. Block-based hybrid coding includes, on a per-block basis, generating a prediction block, determining a difference between the image block and the prediction block as a residual block, and encoding the residual block into a bitstream using two-dimensional transformation, quantization, and entropy coding. To generate a reconstruction of the image frame, on a per-block basis, the decoder reconstructs the residual block using entropy decoding, dequantization, and inverse two-dimensional transformation, generates a corresponding prediction block, and combines the prediction block with the reconstructed residual block to produce a reconstructed image block. To generate the prediction block at the encoder, the decoder, or both (separately), an image and video compression scheme uses previously reconstructed pixels at the boundaries, such as immediately above, to the left, or both, of the current block. Such image and video compression schemes may implement multiple two-dimensional transforms, which are invertible using integer basis functions, such as a Discrete Cosine Transform and a Discrete Sine Transform. The prediction, two-dimensional transformation, and entropy coding are lossless. Quantization is lossy and reconstructed images have quantization errors that are non-uniformly distributed in the spatial domain. The quantization errors are statistically greater for pixels along block boundaries than for interior, non-boundary, pixels.

For example, an input block (X) may be coded using a Discrete Cosine Transform (DCT) and quantization (Q), and the corresponding reconstructed block (X') may be reconstructed using dequantization ($Q^{-1}$) and inverse Discrete Cosine Transformation (IDCT), which may be expressed as $X'=IDCT(Q^{-1}(Q(DCT(X))))$. The errors e(X', X) are not uniformly distributed in the spatial domain, such that the quantization errors at the boundaries (boarders, edges) are statistically high relative to quantization errors at inner, non-boundary, positions. The boundary pixels, which are relatively likely to have quantization error, or have relatively high quantization error, are used for prediction, such as for intra-prediction.

Some image and video compression schemes may implement directional transforms, such as in Mode Dependent Directional Transformation (MDDT), wherein an optimal, in terms of rate-distortion, transform, from a defined set of available transforms, is selected for coding a respective block. Image and video compression schemes that identify an optimal transform may be referred to as Karhunen-Loève transform (KLT) based because such schemes approximate searching for the Karhunen-Loève transform for coding a block. In video coding, the data has finite dimensions. Techniques such as KLT based techniques, which attempt to find an optimal transform for a respective block, and do not alter the data in the spatial domain, such that boundary pixels remain at the boundaries. The implementation of multiple available transformations increases the complexity of the quantization. For example, the quantization may be implemented using quantization matrices that are transform specific, such as because the meaning and relative importance of a coefficient position in the transform domain depends upon the underlying transform. For example, for a transform block generated using a Discrete Cosine Transform, the coefficients at the first row and second column (0,1) and at the first column and second row (1,0) indicate average contrast. The cost, such as bandwidth utilization, for sending, or transmitting, data describing a KLT used may be high relative to the cost savings of using the KLT.

In the implementations of coding, such as encoding or decoding, using circular-shift transformation described herein, the pixel data in the spatial domain is adapted for a defined transform, such as the Discrete Cosine Transform, and KLT based optimization of the transform, such as implemented by Mode Dependent Directional Transformation, is omitted. The circular-shift transformation described herein adapts the data such that boundary pixels, which may be subject to error, may be moved to interior positions, reducing distortion in the reconstructed image. The circular-shift transformation described herein omits implementing transforms other than the defined transform, such as the Discrete Cosine Transform, such that the meaning and relative importance of a coefficient position in the transform domain is consistent, which reduces quantization complexity and increases coefficient uniformity for quantization. The Discrete Cosine Transform is not shift-invariant, such that a transform block generated by applying a Discrete Cosine Transform to spatial domain pixel values that have been circularly shifted (C-SHIFT), which may be expressed as DCT(C-SHIFT(X)) differs from a transform block generated by applying a circular shift (C-SHIFT) to a block generated by applying the Discrete Cosine Transform, which may be expressed as C-SHIFT (DCT(X)). The encoder of an image and video compression schemes implementing circular-shift transformation described herein identifies optimal offsets for circular shifting the spatial domain pixel values of a residual block prior to applying a Discrete Cosine Transform. The corresponding decoder applies the inverse Discrete Cosine Transform and subsequently applies the inverse circular shift to reconstruct the residual block. The circular-shift offsets may be signaled in the bitstream. The circular shift allows better distribution of quantization error and thus improves coding performance.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
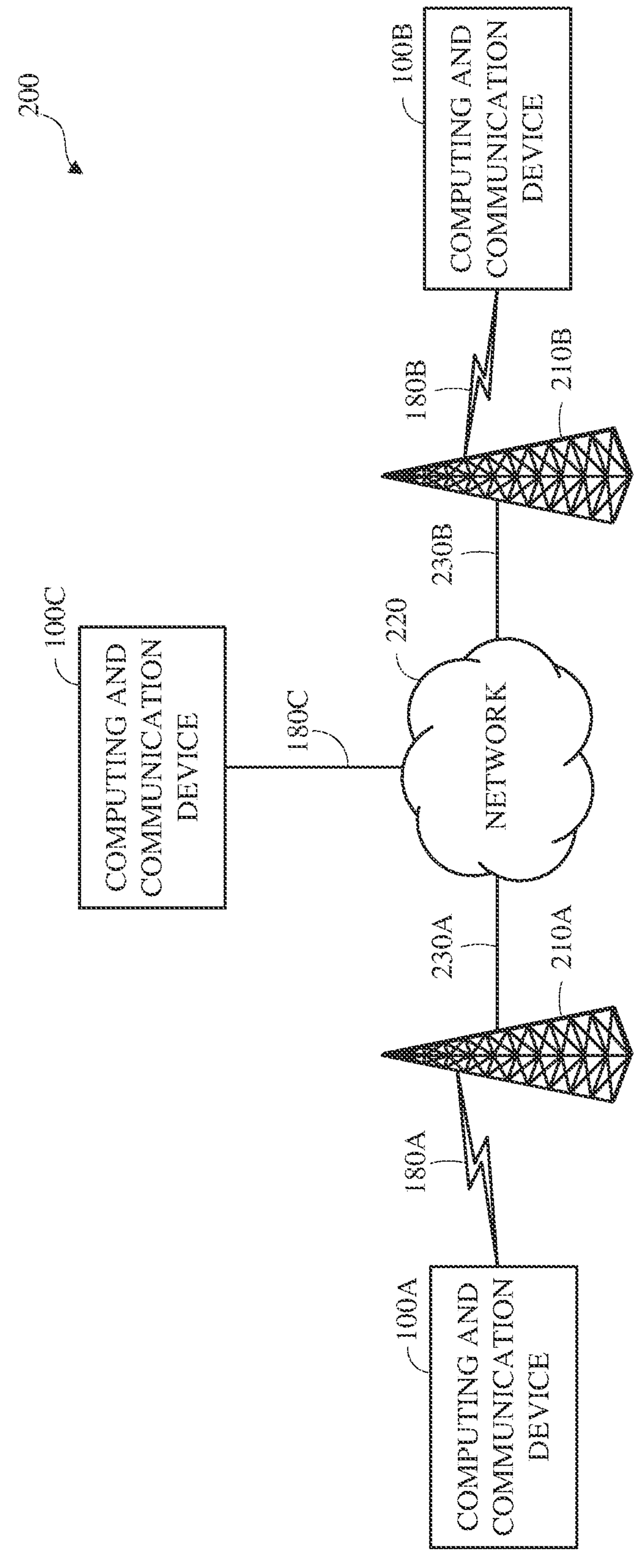
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some, or all, of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more of a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
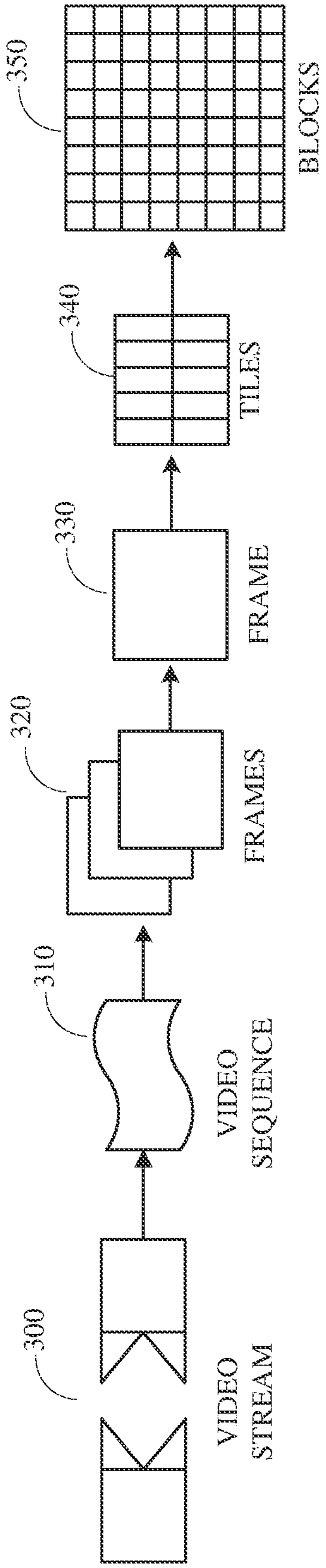
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
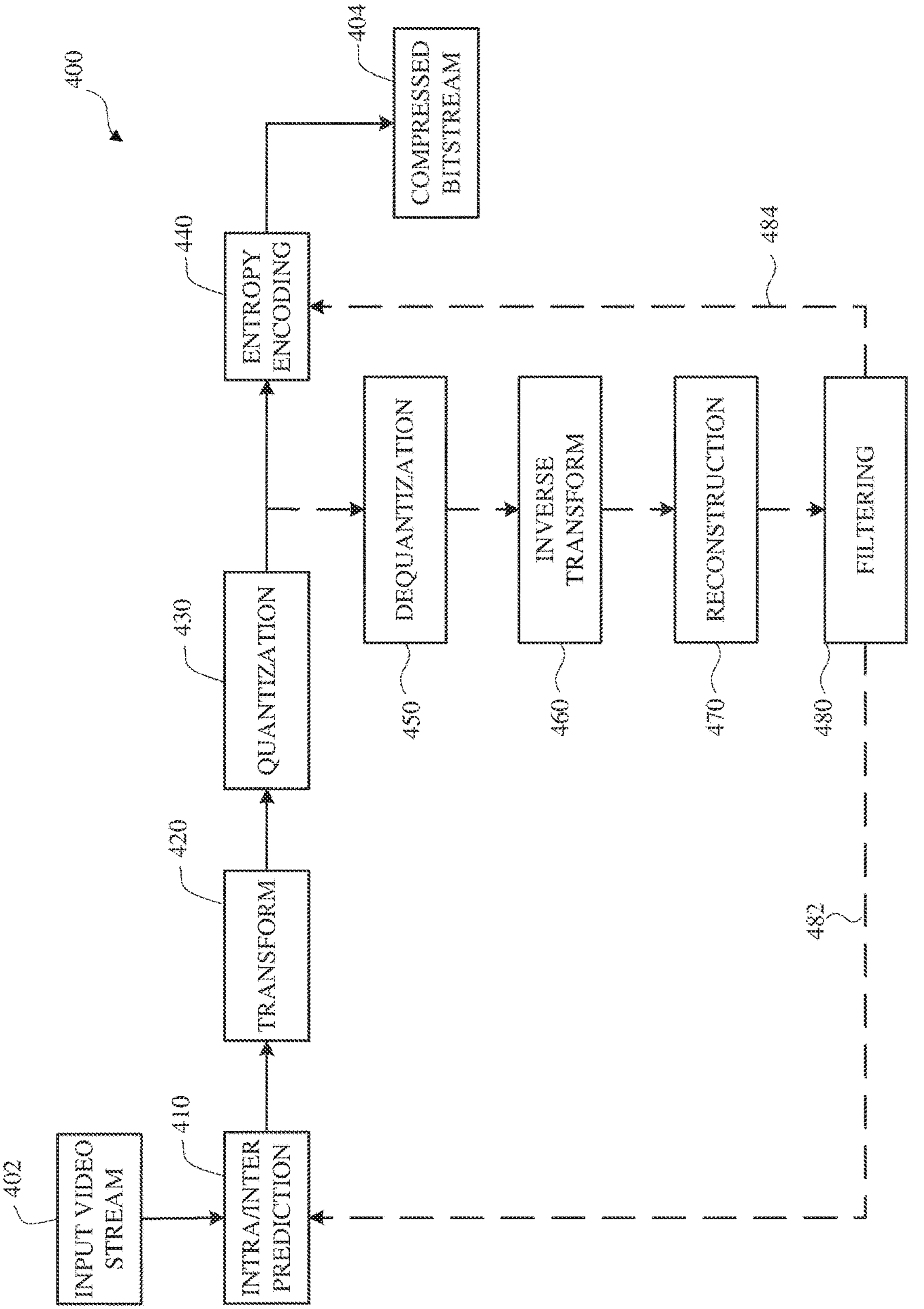
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
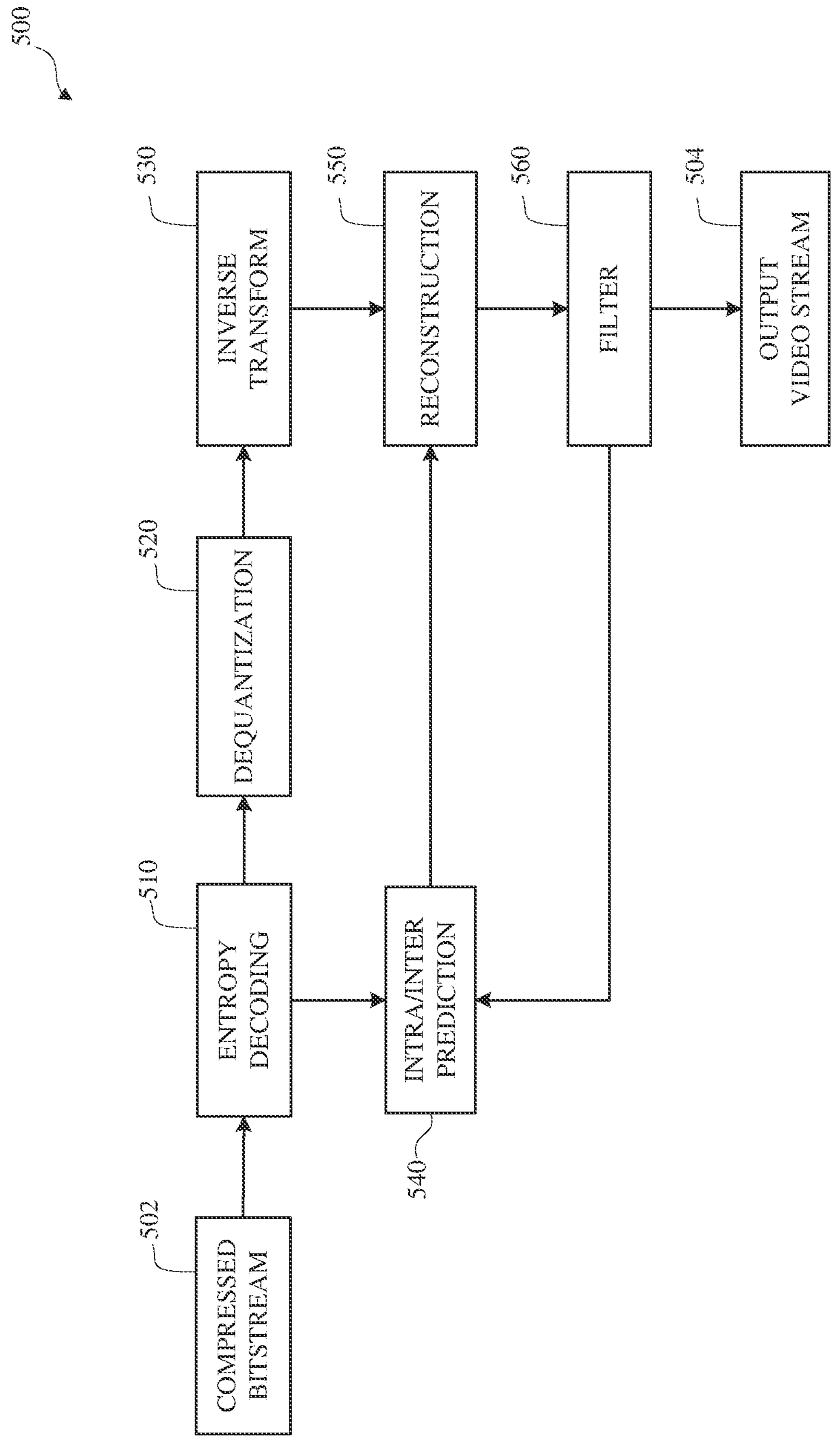
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
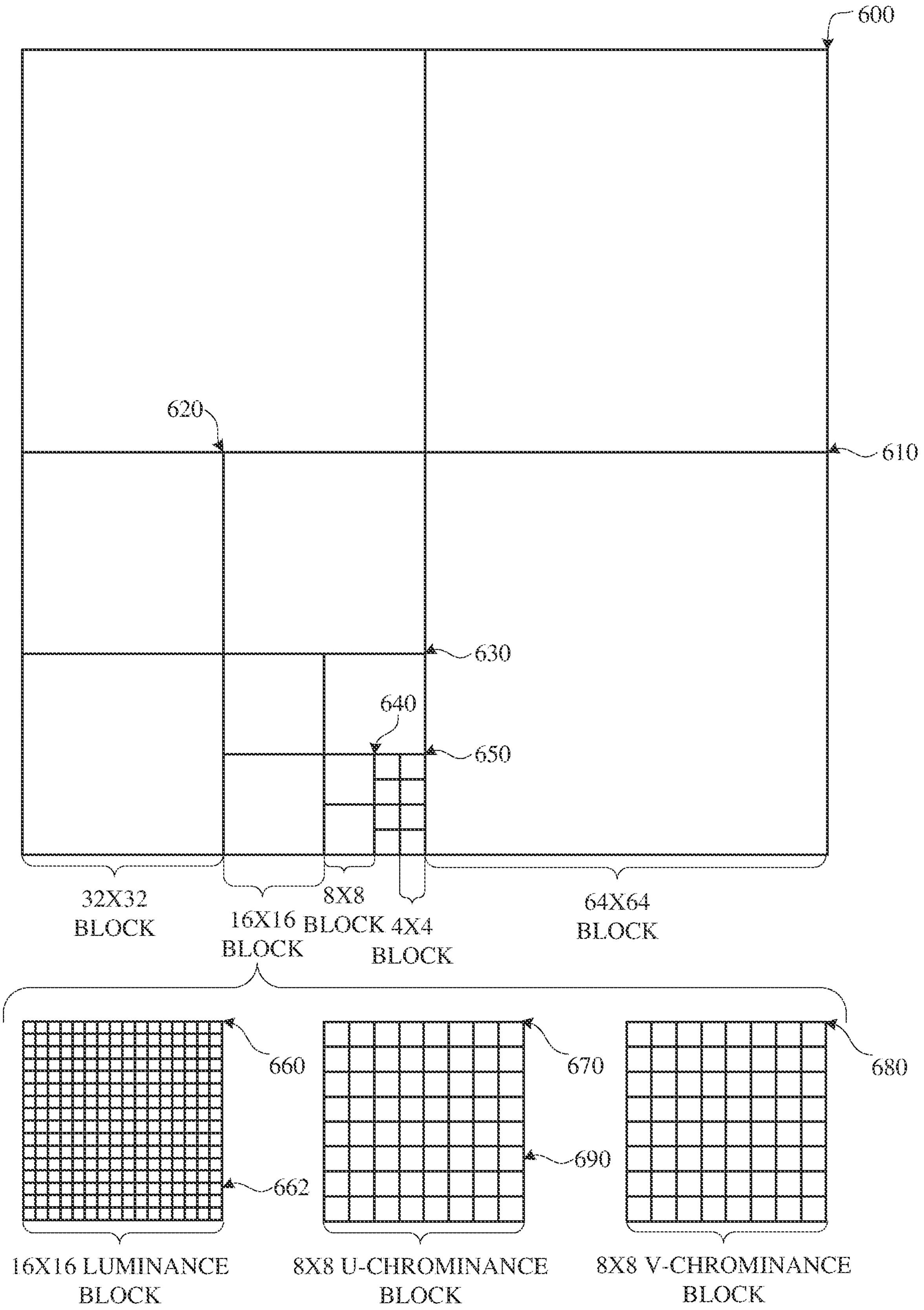
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
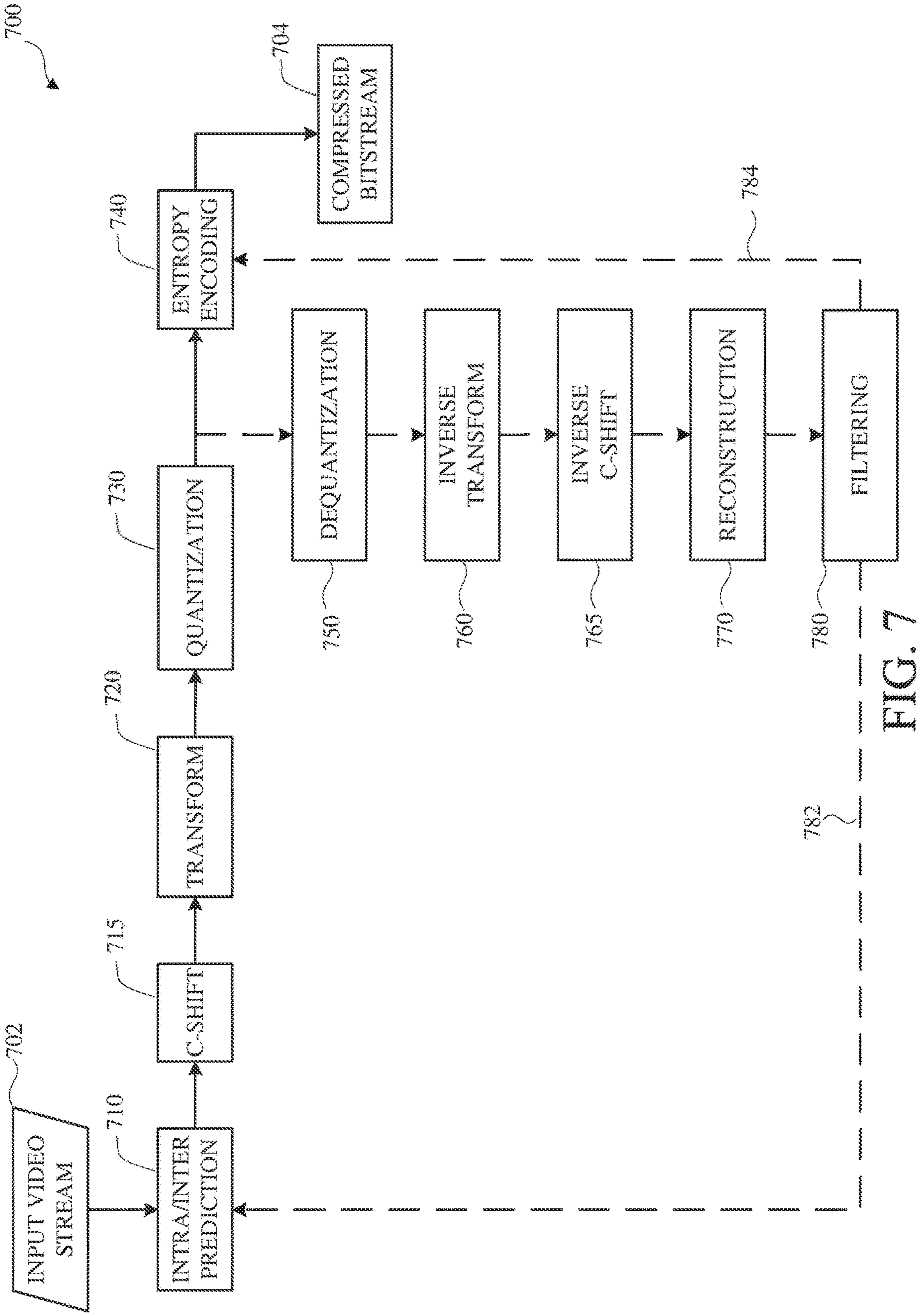
FIG. 7 is a block diagram of an encoder for image or video coding using circular-shift transformation in accordance with implementations of this disclosure.

FIG. 7 is a block diagram of an encoder 700 for image or video coding using circular-shift transformation in accordance with implementations of this disclosure. The encoder 700 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 700 can be implemented as specialized hardware included, for example, in computing device 100. For example, the encoder 700 may be similar to the encoder 400 shown in FIG. 4, except as is described herein or as is otherwise clear from context. Although not expressly shown, image or video coding using circular-shift transformation may be performed on a per-channel basis, such as for luminance data and for chrominance data.

The encoder 700 can encode an input video stream 702, such as the video stream 300 shown in FIG. 3, to generate an encoded (compressed) bitstream 704. As shown, the encoder 700 includes a forward path for generating the compressed bitstream 704. The forward path includes an intra/inter prediction unit 710, a circular-shift unit 715, a transform unit 720, a quantization unit 730, and an entropy encoding unit 740. Other components, or combinations of components, may be used. As shown, the encoder 700 includes a reconstruction path (indicated by broken directional lines) to reconstruct image data for encoding of subsequent image data. The reconstruction path includes a dequantization unit 750, an inverse transform unit 760, an inverse circular-shift unit 765, a reconstruction unit 770, and a filtering unit 780. Other components, or combinations of components, may be used.

The intra/inter prediction unit 710 is similar to the intra/inter prediction unit 410 shown in FIG. 4, except as is described herein or as is otherwise clear from context. The intra/inter prediction unit 710 obtains, receives, or otherwise accesses, input image or video data. Although not shown expressly in FIG. 7, in some implementations, the encoder 700 may determine whether using a circular shift (circular-shift transformation) is enabled, such as on a per-video basis, on a per-group of pictures basis, on a per-sequence basis, on a per-frame basis, on a per-tile basis, on a per-coding unit basis, on a per-slice basis, on a per-block basis. For example, whether circular-shift transformation is enabled may be indicated using a flag, such as a bit, wherein a first defined value, such as zero (0), indicates that circular-shift transformation is disabled, and a second defined value, such as one (1), indicates that circular-shift transformation is enabled.

The intra/inter prediction unit 710 generates prediction values, such as a prediction block, for encoding a current block from a current frame, from an input video sequence, or a current image. The intra/inter prediction unit 710 subtracts the prediction block from the current (input) block to produce a residual block.

A circular shift (C-SHIFT) reorganizes, or rearranges, the elements of a block or matrix (X), such as the residual pixel values of the residual block generated by the intra/inter prediction unit 710, which is an N×M block or matrix including (N) rows and (M) columns, by shifting values up by a number, or cardinality, of rows indicated by the vertical circular-shift offset (n), wherein values shifted up from the top row of the block or matrix are shifted to the bottom row of the block or matrix, and shifting values to the left by a number, or cardinality, of columns indicated by the horizontal circular-shift offset (m), wherein values shifted to the left from the left column of the block or matrix are shifted to the right row of the block or matrix. Although a circular shift is described herein, other techniques for rearranging pixel values may be used, such as other shift operations, which may be invertible, such as shift operations, or combinations of shift operations, that exchange, or swap, rows, or columns, or both. The top-left transform coefficient (DC value) of a transform block generated by transforming a block is equal to the top-left transform coefficient (DC value) of a transform block generated by circular shifting a block and transforming the circular shifted block.

An inverse circular shift (INVERSE C-SHIFT) reorganizes, or rearranges, the elements of a block or matrix (X), which is a N×M block or matrix including (N) rows and (M) columns, by shifting values down by a number, or cardinality, of rows indicated by the vertical circular-shift offset (n), or, equivalently, by shifting values up by the negative of vertical circular-shift offset ($-n=n^{*}-1$), wherein values shifted down from the bottom row of the block or matrix are shifted to the top row of the block or matrix, and shifting values to the right by a number, or cardinality, of columns indicated by the horizontal circular-shift offset (m), or, equivalently, by shifting values left by the negative of the horizontal circular-shift offset ($-m=m^{*}-1$), wherein values shifted to the right from the right column of the block or matrix are shifted to the left row of the block or matrix.

Figure 10:
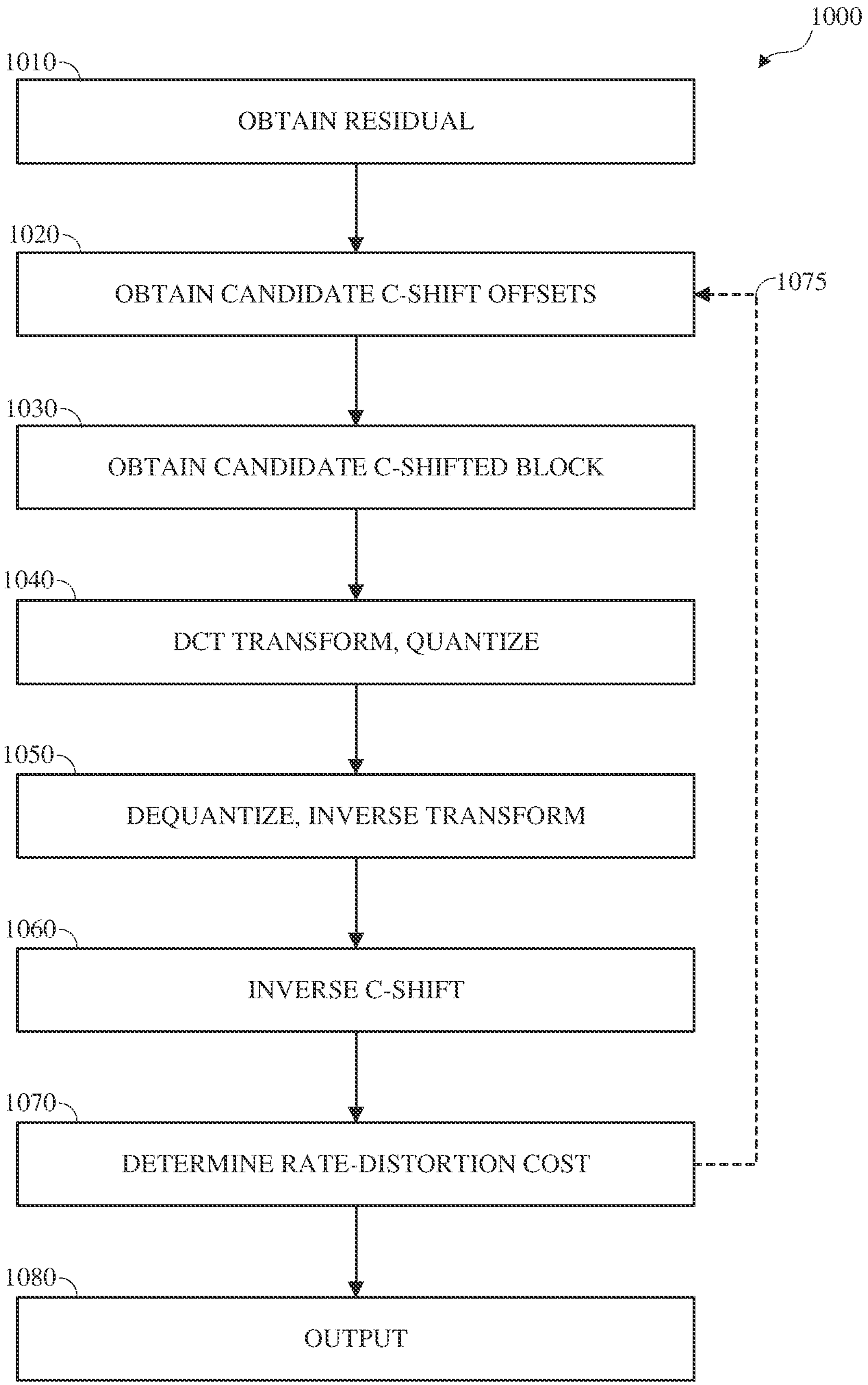
FIG. 10 is a flowchart diagram of an example of determining optimal circular-shift offsets in accordance with implementations of this disclosure.

The circular-shift unit 715 (C-SHIFT) identifies an optimal circular shift, which includes identifying optimal circular-shift (c-shift) offsets. The circular-shift offsets include a vertical circular-shift offset (n*), a horizontal circular-shift offset (m*), or both. For simplicity, the optimal circular shift of a block (X) may be expressed as C-SHIFT(X, n*, m*). An example of obtaining the optimal circular-shift offsets is shown in FIG. 10.

The circular-shift unit 715 obtains circular-shifted residual values (c-shifted residual values), or a circular-shifted residual block (c-shifted residual block), by applying, or performing, the optimal circular shift (C-SHIFT(X, n*, m*)) on the residual values (residual block) block generated by the intra/inter prediction unit 710. For simplicity, the circular-shifted residual values may be referred to using the notation for performing the optimal circular shift (C-SHIFT(X, n*, m*)).

Although the circular-shift unit 715, the transform unit 720, the quantization unit 730, the dequantization unit 750, the inverse transform unit 760, and the inverse circular-shift unit 765, are shown as distinct units, the circular-shift unit 715, the transform unit 720, the quantization unit 730, the dequantization unit 750, the inverse transform unit 760, and the inverse circular-shift unit 765 may be combined or may be used in combination, such as wherein rate-distortion optimization includes circular-shifting, transforming, quantizing, dequantizing, inverse transforming, and inverse circular-shifting.

The transform unit 720 is similar to the transform unit 420 shown in FIG. 4, except as is described herein or as is otherwise clear from context. The transform unit 720 obtains, generates, or calculates, transform coefficients (transform block) by applying, or performing, a defined transform, such as a Discrete Cosine Transform, to the circular-shifted residual values obtained by the circular-shift unit 715. For example, performing a Discrete Cosine Transform to the circular-shifted residual values obtained by the circular-shift unit 715, may be expressed as DCT(C-SHIFT (X, n*, m*)). Although the techniques described herein are described with reference to using the Discrete Cosine Transform, for simplicity, other transforms may be used, such as the Singular Value Decomposition Transform (SVD) or the Asymmetric Discrete Sine Transform (ADST). The transform unit 720 may omit implementing transforms other than the defined transform. For transforming circular-shifted residual values, the transform unit 720 may omit identifying a transform, or transform type, other than the defined transform. For simplicity, the transform coefficients (transform block) may be referred to using the notation for performing the transform DCT(C-SHIFT(X, n*, m*)).

The quantization unit 730 is similar to the quantization unit 430 shown in FIG. 4, except as is described herein or as is otherwise clear from context. The quantization unit 730 obtains, generates, or calculates, quantized transform coefficients (quantized transform block) by applying, or performing, quantization to the transform coefficients (transform block) obtained by the transform unit 720, which may be expressed as Q(DCT(C-SHIFT(X, n*, m*))). The quantization unit 730 implements quantization for use with transform coefficients generated using the Discrete Cosine Transform, which may include accessing a previously stored quantization matrix. The quantization unit 730 may omit storing, processing, or otherwise implementing quantization, or quantization matrices, for transforms other than the Discrete Cosine Transform. For simplicity, the quantized transform coefficients (quantized transform block) may be referred to using the notation for performing the quantization Q(DCT(C-SHIFT(X, n*, m*))).

The entropy encoding unit 740 is similar to the entropy encoding unit 440 shown in FIG. 4, except as is described herein or as is otherwise clear from context. The entropy encoding unit 740 generates an encoded, or compressed, bitstream, or one or more portions thereof, by entropy coding the quantized transform coefficients obtained by the quantization unit 730. The entropy encoding unit 740, or another component of the encoder 700, includes, in the encoded, or compressed, bitstream, data, such as a flag or bit, indicating that circular-shift transformation is enabled. The indication that circular-shift transformation is enabled may be included in the bitstream on a per-video basis, on a per-group of pictures basis, on a per-sequence basis, on a per-frame basis, such as in a frame header, on a per-tile basis, such as in a tile header, on a per-coding unit basis, on a per-slice basis, or on a per-block basis, such as in a block header. The entropy encoding unit 740, or another component of the encoder 700, includes, in the encoded, or compressed, bitstream, the optimal circular-shift offsets (n*, m*). Including the optimal circular-shift offsets (n*, m*) in the bitstream may include differentially coding one or both of the optimal circular-shift offsets (n*, m*). In some implementations, the indication that circular-shift transformation is enabled, or another value or flag included in the bitstream, may indicate a type of shift operation.

In some implementations, the circular-shift offsets may be signaled by reference. For example, a value or flag indicating that circular-shift offsets used for a previously decoded block are used for the current block. In some implementations, signaling, transmitting, or including the circular-shift offsets (n*, m*) in the bitstream may be omitted, and the circular-shift offsets may be identified, or inferred, at the decoder based on context, such as by using the circular-shift offsets used for a previously decoded block, using other data from the current decoded block, or by using a combination thereof.

For some transform blocks, such as transform blocks having zero (0) value AC coefficients, other than the (0,0), top left, DC, coefficient, or transform blocks that are uniform in the DCT domain, which have one non-zero value in the spatial domain, the optimal circular shift (C-SHIFT(X, n*, m*)) is equivalent to the quantized transformed circular-shifted by (n*, m*) block, and signaling, transmitting, or including, the circular-shift offsets (n*, m*) in the bitstream may be omitted.

The dequantization unit 750 is similar to the dequantization unit 450 shown in FIG. 4, except as is described herein or as is otherwise clear from context. The dequantization unit 750 obtains, generates, or calculates, dequantized transform coefficients for the current block by dequantizing the quantized transform coefficients Q(DCT(C-SHIFT(X, n*, m*))), which may be expressed as InvQ(Q(DCT(C-SHIFT (X, n*, m*)))). The dequantization unit 750 implements dequantization for use with quantized transform coefficients generated using transform coefficients generated using the Discrete Cosine Transform, which may include accessing a stored quantization matrix. The dequantization unit 750 may omit storing, processing, or otherwise implementing dequantization, or quantization matrices, for transforms other than the Discrete Cosine Transform. For simplicity, the dequantized transform coefficients (dequantized transform block) may be referred to using the notation for performing the dequantization InvQ(Q(DCT(C-SHIFT(X, n*, m*)))).

The inverse transform unit 760 is similar to the inverse transform unit 460 shown in FIG. 4, except as is described herein or as is otherwise clear from context. The inverse transform unit 760 obtains, generates, or calculates, reconstruction circular-shifted residual values (reconstruction circular-shifted residual block) by applying, or performing, an inverse Discrete Cosine Transform to the dequantized transform coefficients InvQ(Q(DCT(C-SHIFT(X, n*, m*)))) obtained by the dequantization unit 750, which may be expressed as IDCT(InvQ(Q(DCT(C-SHIFT(X, n*, m*))))). The inverse transform unit 760 may omit implementing transforms other than the Discrete Cosine Transform. For inverse transforming circular-shifted residual values, the inverse transform unit 760 may omit identifying a transform, or transform type, other than the Discrete Cosine Transform. For simplicity, the reconstruction circular-shifted residual values (reconstruction circular-shifted residual block) may be referred to using the notation for performing the inverse transform IDCT(InvQ(Q(DCT(C-SHIFT(X, n*, m*))))).

The inverse circular-shift unit 765 obtains reconstruction residual values (reconstruction residual block), by applying, or performing, an inverse optimal circular shift, or the optimal circular shift using the negatives of the optimal circular shift offsets, (C-SHIFT(X,−n*,−m*)) on the reconstruction circular-shifted residual values IDCT(InvQ(Q (DCT(C-SHIFT(X, n*, m*))))) obtained by the inverse transform unit 760, which may be expressed as SHIFT (IDCT(InvQ(Q(DCT(SHIFT(X, n*, m*))))),−n*,−m*). For simplicity, the reconstruction residual values (reconstruction residual block) may be referred to using the notation for performing the inverse optimal circular shift (SHIFT(IDCT (InvQ(Q(DCT(SHIFT(X, n*, m*))))), −n*,−m*)). Although not shown expressly in FIG. 7, the inverse circular-shift unit 765 may obtain the optimal circular-shift offsets (n*, m*) from the circular-shift unit 715, or may read, or otherwise access, the optimal circular-shift offsets (n*, m*) from the encoded image or video data, or from a memory of, or accessible by, the encoder 700.

The reconstruction unit 770 is similar to the reconstruction unit 470 shown in FIG. 4, except as is described herein or as is otherwise clear from context. The reconstruction unit 770 adds the prediction block generated by the intra/inter prediction unit 710 to the reconstruction residual block (SHIFT (IDCT(InvQ(Q(DCT(SHIFT(X, n*, m*))))),−n*,−m*)) to obtain decoded values (a decoded block).

The filtering unit 780 is similar to the filtering unit 480 shown in FIG. 4, except as is described herein or as is otherwise clear from context. The filtering unit 780 filters the decoded block to generate a reconstructed block (X"). In some implementations, filtering by the filtering unit 780 may be omitted, or may include multiple iterations of filtering, which may include multiple types of filtering.

Figure 8:
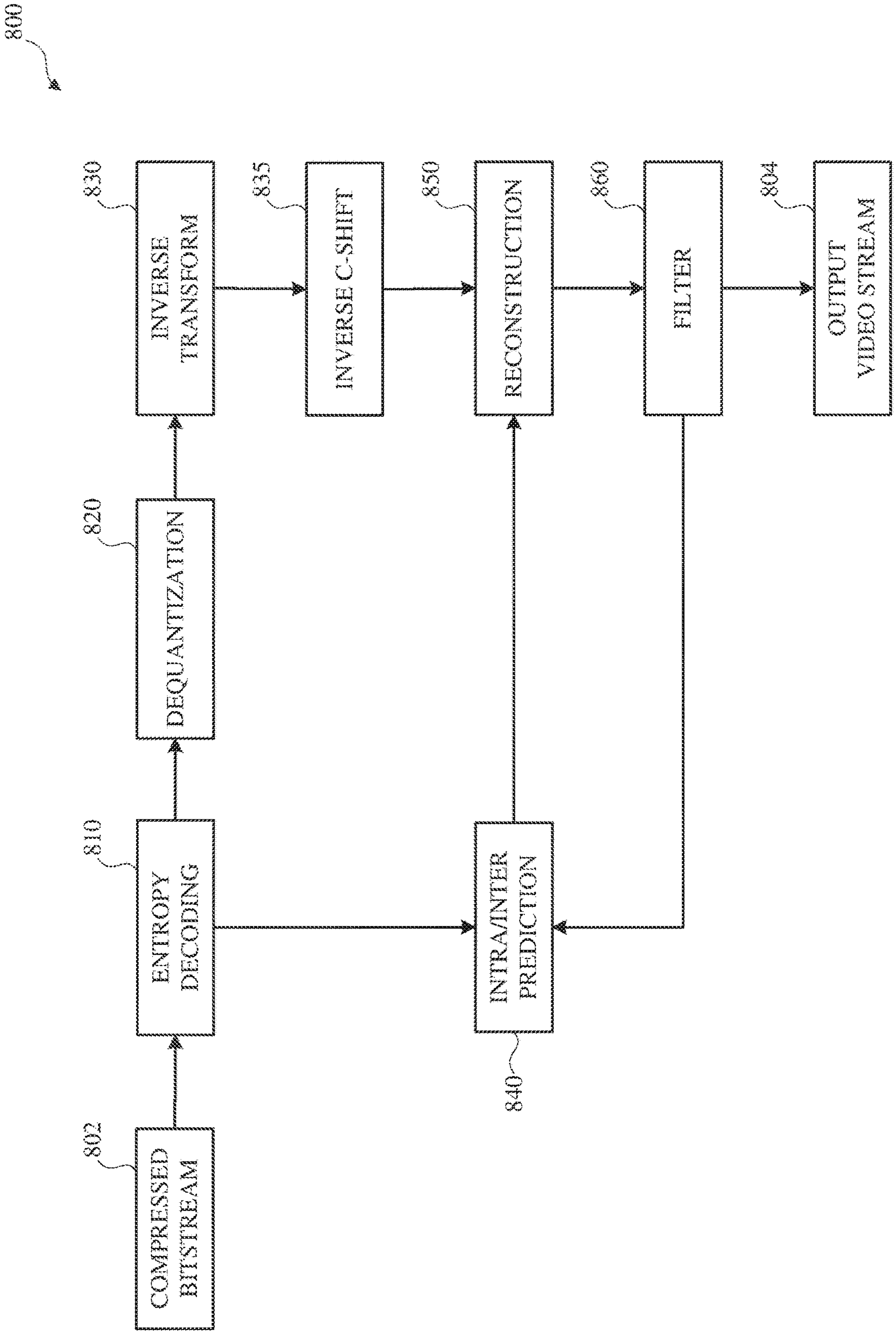
FIG. 8 is a block diagram of a decoder for image or video coding using circular-shift transformation in accordance with implementations of this disclosure.

FIG. 8 is a block diagram of a decoder 800 for image or video coding using circular-shift transformation in accordance with implementations of this disclosure. The decoder 800 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode image or video data as described herein. The decoder 800 can be implemented as specialized hardware included, for example, in computing device 100. For example, the decoder 800 may be similar to the decoder 500 shown in FIG. 5, except as is described herein or as is otherwise clear from context. Although not expressly shown, image or video coding using circular-shift transformation may be performed on a per-channel basis, such as for luminance data and for chrominance data.

The decoder 800 receives, or otherwise accesses, an encoded, or compressed, bitstream 802, such as the compressed bitstream 704 shown in FIG. 7, and decodes the encoded, or compressed, bitstream 802 to generate an output video stream 804. As shown, the decoder 800 includes an entropy decoding unit 810 (ENTROPY DECODING), a dequantization unit 820 (DEQUANTIZATION), an inverse transform unit 830 (INVERSE TRANSFORM), an inverse circular-shift unit 835 (INVERSE C-SHIFT), an intra/inter prediction unit 840 (INTRA/INTER PREDICTION), a reconstruction unit 850 (RECONSTRUCTION), and a filtering unit 860 (FILTER). Other components, or combinations of components, may be used. Some components, such as the filtering unit 860, may be omitted.

The entropy decoding unit 810 is similar to the entropy decoding unit 510 shown in FIG. 5, except as is described herein or as is otherwise clear from context. The entropy decoding unit 810 obtains quantized transform coefficients (Q(DCT(SHIFT(X, n*, m*)))) by entropy decoding the quantized transform coefficients (Q(DCT(SHIFT(X, n*, m*)))) from the encoded, or compressed, bitstream 802, which includes reading, or extracting, entropy coded data from the encoded, or compressed, bitstream 802.

The entropy decoding unit 810, or another component of the decoder 800, obtains, from the encoded, or compressed, bitstream 802, data, such as a flag or bit, (a circular-shift indicator) indicating that circular-shift transformation is enabled. The circular-shift indicator may be decoded from the bitstream on a per-video basis, on a per-group of pictures basis, on a per-sequence basis, on a per-frame basis, such as from a frame header, on a per-tile basis, such as from a tile header, on a per-coding unit basis, on a per-slice basis, or on a per-block basis, such as from a block header.

The entropy decoding unit 810, or another component of the decoder 800, obtains from the encoded, or compressed, bitstream, circular-shift offsets, which are the optimal circular-shift offsets (n*, m*) identified by the encoder, such as by the encoder 700 shown in FIG. 7. Decoding the optimal circular-shift offsets (n*, m*) from the bitstream may include differentially decoding one or both of the optimal circular-shift offsets (n*, m*). In some implementations, the indication that circular-shift transformation is enabled, or another value or flag included in the bitstream, may indicate a type of shift operation.

In some implementations, the circular-shift offsets may be signaled by reference. For example, a value or flag indicating that circular-shift offsets used for a previously decoded block are used for the current block may be decoded. In some implementations, decoding the circular-shift offsets (n*, m*) from the bitstream may be omitted, and the circular-shift offsets may be identified, or inferred, by the decoder based on context, such as by using the circular-shift offsets used for a previously decoded block, using other data from the current decoded block, or by using a combination thereof.

For some transform blocks, such as transform blocks having zero (0) value AC coefficients, other than the (0,0), top left, DC, coefficient, or transform blocks that are uniform in the DCT domain, which have one non-zero value in the spatial domain, the optimal circular shift (C-SHIFT(X, n*, m*)) is equivalent to the quantized transformed circular-shifted by (n*, m*) block, and the entropy decoding unit 810, or another component of the decoder 800, determines that the circular-shift offsets are unavailable from the encoded bitstream and otherwise omits decoding the circular-shift offsets (n*, m*) from the bitstream.

The dequantization unit 820 is similar to the dequantization unit 520 shown in FIG. 5 or the dequantization unit 750 shown in FIG. 7, except as is described herein or as is otherwise clear from context. The dequantization unit 820 obtains, generates, or calculates, dequantized transform coefficients for the current block by dequantizing the quantized transform coefficients (Q(DCT(C-SHIFT(X, n*, m*)))) obtained by the entropy decoding unit 810, which may be expressed as InvQ(Q(DCT(C-SHIFT(X, n*, m*)))). The dequantization unit 820 implements dequantization for use with quantized transform coefficients generated using transform coefficients generated using the Discrete Cosine Transform, which may include accessing a stored quantization matrix. The dequantization unit 820 may omit storing, processing, or otherwise implementing dequantization, or quantization matrices, for transforms other than the Discrete Cosine Transform. For simplicity, the dequantized transform coefficients (dequantized transform block) may be referred to using the notation for performing the dequantization (InvQ(Q(DCT(C-SHIFT(X, n*, m*))))).

The inverse transform unit 830 is similar to the inverse transform unit 530 shown in FIG. 5 or the inverse transform unit 760 shown in FIG. 7, except as is described herein or as is otherwise clear from context. The inverse transform unit 830 obtains, generates, or calculates, reconstruction circular-shifted residual values (reconstruction circular-shifted residual block) by applying, or performing, an inverse Discrete Cosine Transform to the dequantized transform coefficients InvQ(Q(DCT(C-SHIFT(X, n*, m*)))) obtained by the dequantization unit 820, which may be expressed as IDCT(InvQ(Q(DCT(C-SHIFT(X, n*, m*))))). The inverse transform unit 830 may omit implementing transforms other than the Discrete Cosine Transform. For inverse transforming circular-shifted residual values, the inverse transform unit 830 may omit identifying a transform, or transform type, other than the Discrete Cosine Transform. For simplicity, the reconstruction circular-shifted residual values (reconstruction circular-shifted residual block) may be referred to using the notation for performing the inverse transform (IDCT(InvQ(Q(DCT(C-SHIFT(X, n*, m*))).

The inverse circular-shift unit 835 is similar to the inverse circular-shift unit 765 shown in FIG. 7, except as is described herein or as is otherwise clear from context. The inverse circular-shift unit 835 obtains reconstruction residual values (reconstruction residual block), by applying, or performing, an inverse optimal circular shift, or the optimal circular shift using the negatives of the optimal circular shift offsets, (C-SHIFT(X,−n*,−m*)) on the reconstruction circular-shifted residual values IDCT(InvQ(Q(DCT(C-SHIFT(X, n*, m*))))) obtained by the inverse transform unit 830, which may be expressed as SHIFT(IDCT(InvQ(Q(DCT(SHIFT(X, n*, m*))))),−n*,−m*). For simplicity, the reconstruction residual values (reconstruction residual block) may be referred to using the notation for performing the inverse optimal circular shift (SHIFT(IDCT(InvQ(Q(DCT(SHIFT(X, n*, m*))))),−n*,−m*)).

For transform blocks for which the entropy decoding unit 810, or another component of the decoder 800, determines that the circular-shift offsets are unavailable from the encoded bitstream, the inverse circular shift is omitted and the reconstruction circular-shifted residual values are used as the reconstruction residual values.

The intra/inter prediction unit 840 is similar to the intra/inter prediction unit 540 shown in FIG. 5 or the intra/inter prediction unit 710 shown in FIG. 7, except as is described herein or as is otherwise clear from context. The intra/inter prediction unit 840 generates prediction values, such as prediction block, for reconstructing the current block.

The reconstruction unit 850 is similar to the reconstruction unit 550 shown in FIG. 5 or the reconstruction unit 770 shown in FIG. 7, except as is described herein or as is otherwise clear from context. The reconstruction unit 850 combines, such as adds, the prediction block generated by the intra/inter prediction unit 840 to the reconstruction residual block (SHIFT(IDCT(InvQ(Q(DCT(SHIFT(X, n*, m*))))),−n*,−m*)) to obtain decoded values (a decoded block).

The filtering unit 860 is similar to the filtering unit 560 shown in FIG. 5 or the filtering unit 780 shown in FIG. 7, except as is described herein or as is otherwise clear from context. The filtering unit 860 filters the decoded block to generate a reconstructed block (X"). In some implementations, filtering by the filtering unit 860 may be omitted, or may include multiple iterations of filtering, which may include multiple types of filtering.

The reconstructed block is included in the output video stream 804. The output video stream 804 may be output for presentation to a user, stored, or both.

Figure 9:
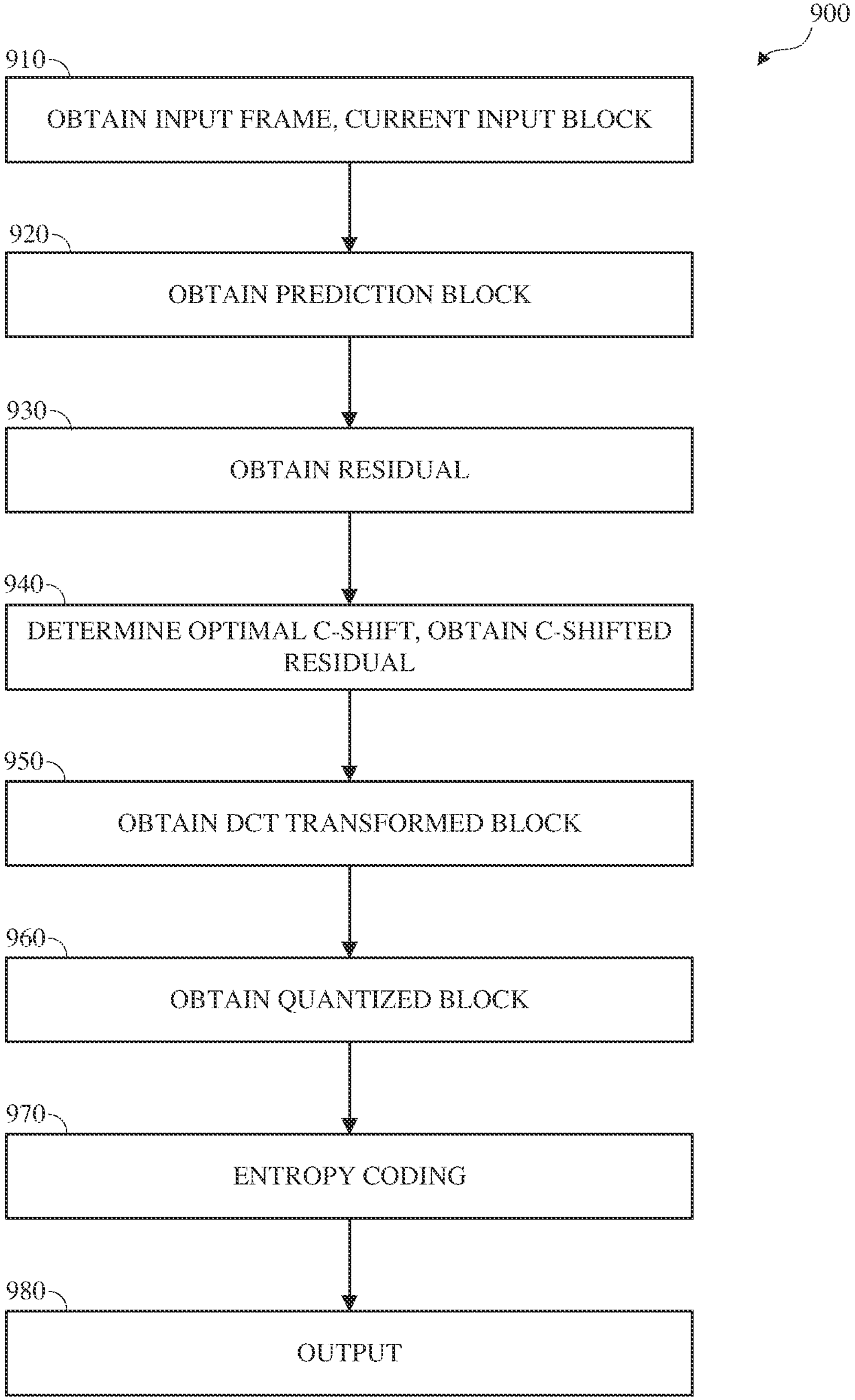
FIG. 9 is a flowchart diagram of an example of encoding using circular-shift transformation in accordance with implementations of this disclosure.

FIG. 9 is a flowchart diagram of an example of encoding using circular-shift transformation 900 in accordance with implementations of this disclosure. Encoding using circular-shift transformation 900 may be implemented in an encoder, such as the encoder 700 shown in FIG. 7. Although not expressly shown, encoding using circular-shift transformation 900 may be performed on a per-channel basis, such as for luminance data and for chrominance data.

Encoding using circular-shift transformation 900 includes encoding an input image or video steam, such as the input video stream 702 shown in FIG. 7, to generate an encoded (compressed) bitstream, such as the encoded (compressed) bitstream 704 shown in FIG. 7. As shown in FIG. 9, encoding using circular-shift transformation 900 includes obtaining a current input frame and a current input block from the current input frame (at 910), obtaining a prediction block (at 920), obtaining a residual block (at 930), determining an optimal circular-shift and obtaining a circular-shifted residual block (at 940), obtaining a Discrete Cosine Transformed block (at 950), obtaining a quantized block (at 960), entropy coding (at 970), and outputting (at 980).

A prediction block (prediction values) is obtained (at 920) for the current input block, such as by an intra/inter prediction unit, such as the intra/inter prediction unit 710 shown in FIG. 7. Although not shown expressly in FIG. 7, in some implementations, the encoder may determine that using circular-shift transformation is enabled, such as on a per-video basis, on a per-group of pictures basis, on a per-sequence basis, on a per-frame basis, on a per-tile basis, on a per-coding unit basis, on a per-slice basis, on a per-block basis. For example, whether circular-shift transformation is enabled may be indicated using a flag, such as a bit, wherein a first defined value, such as zero (0), indicates that circular-shift transformation is disabled, and a second defined value, such as one (1), indicates that circular-shift transformation is enabled.

A residual block is obtained (at 930) by subtracting the prediction block from the current input block.

An optimal circular-shift is determined and a circular-shifted residual block is obtained (at 940), which includes identifying optimal circular-shift (c-shift) offsets. For example, a circular-shift unit, such as the circular-shift unit 715 shown in FIG. 7, may identify the optimal circular shift. The circular-shift offsets include a vertical circular-shift offset (n*), a horizontal circular-shift offset (m*), or both. For simplicity, the optimal circular shift of a block (X) may be expressed as C-SHIFT(X, n*, m*). An example of obtaining the optimal circular-shift offsets is shown in FIG. 10.

The circular-shift unit obtains circular-shifted residual values (c-shifted residual values), or a circular-shifted residual block (c-shifted residual block), by applying, or performing, the optimal circular shift (C-SHIFT(X, n*, m*)) on the residual values (residual block) block. For simplicity, the circular-shifted residual values may be referred to using the notation for performing the optimal circular shift (C-SHIFT(X, n*, m*)).

A Discrete Cosine Transformed block is obtained (at 950). For example, a transform unit, such as the transform unit 720 shown in FIG. 7, obtains, generates, or calculates, transform coefficients (a transform block) by applying, or performing, a Discrete Cosine Transform to the circular-shifted residual values, which may be expressed as DCT(C-SHIFT(X, n*, m*)). For simplicity, the transform coefficients (transform block) may be referred to using the notation for performing the transform DCT(C-SHIFT(X, n*, m*)).

A quantized block is obtained (at 960). For example, a quantization unit, such as the quantization unit 730 shown in FIG. 7, obtains, generates, or calculates, quantized transform coefficients (a quantized transform block) by applying, or performing, quantization to the transform coefficients, which may be expressed as Q(DCT(C-SHIFT(X, n*, m*))). For simplicity, the quantized transform coefficients may be referred to using the notation for performing the quantization Q(DCT(C-SHIFT(X, n*, m*))).

The quantized transform block is entropy coded (at 970) to obtain an output, encoded, or compressed, bitstream. For example, an entropy encoding unit, such as the entropy encoding unit 740 shown in FIG. 7, generates the encoded, or compressed, bitstream, or one or more portions thereof, by entropy coding the quantized transform coefficients. The entropy coded data for the quantized transform coefficients is included in the output encoded, or compressed, bitstream. Encoded, or compressed, bitstream, data, such as a flag or bit, indicating that circular-shift transformation is enabled is included in the output, encoded, or compressed, bitstream. The indication that circular-shift transformation is enabled may be included in the bitstream on a per-video basis, on a per-group of pictures basis, on a per-sequence basis, such as in a sequence header, on a per-frame basis, such as in a frame header, on a per-tile basis, such as in a tile header, on a per-coding unit basis, on a per-slice basis, or on a per-block basis, such as in a block header. The optimal circular-shift offsets (n*, m*) are, or entropy coded data corresponding thereto is, included in the output, encoded, or compressed, bitstream. Including the optimal circular-shift offsets (n*, m*) in the bitstream may include differentially coding one or both of the optimal circular-shift offsets (n*, m*). In some implementations, the indication that circular-shift transformation is enabled, or another value or flag included in the bitstream, may indicate a type of shift operation.

In some implementations, expressly including the optimal circular-shift offsets (n*, m*) in the bitstream may be omitted and including the optimal circular-shift offsets (n*, m*) in the bitstream may include signaling the optimal circular-shift offsets (n*, m*) by reference. For example, a value or flag indicating that circular-shift offsets used for a previously decoded block are used for the current block may be decoded. In some implementations, decoding the circular-shift offsets (n*, m*) from the bitstream may be omitted, and the circular-shift offsets may be identified, or inferred, by the decoder based on context, such as by using the circular-shift offsets used for a previously decoded block, using other data from the current decoded block, or by using a combination thereof.

For some transform blocks, such as transform blocks having zero (0) value AC coefficients, other than the (0,0), top left, DC, coefficient, or transform blocks that are uniform in the DCT domain, which have one non-zero value in the spatial domain, the optimal circular shift (C-SHIFT(X, n*, m*)) is equivalent to the quantized transformed circular-shifted by (n*, m*) block, and signaling, transmitting, or including, the circular-shift offsets (n*, m*) in the output, encoded, or compressed, bitstream may be omitted such that the circular-shift offsets (n*, m*) are unavailable from the encoded bitstream at the decoder.

The output, encoded, or compressed, bitstream is output (at 980), such as stored or transmitted to a decoder.

FIG. 10 is a flowchart diagram of an example of determining optimal circular-shift offsets 1000 in accordance with implementations of this disclosure. Determining optimal circular-shift offsets 1000 may be implemented in an encoder, such as the encoder 700 shown in FIG. 7, for example, a circular-shift, such as the circular-shift unit 715 shown in FIG. 7 may implement determining optimal circular-shift offsets 1000. Determining optimal circular-shift offsets 1000 may be similar to obtaining optimal circular-shift offsets (at 940) as shown in FIG. 9. Although not expressly shown, determining optimal circular-shift offsets 1000 may be performed on a per-channel basis, such as for luminance data and for chrominance data.

Determining optimal circular-shift offsets 1000 includes obtaining residual data (at 1010) (OBTAIN RESIDUAL), obtaining current candidate circular-shift offsets (at 1020) (OBTAIN CANDIDATE C-SHIFT OFFSETS), obtaining a candidate circular-shifted residual block (at 1030) (OBTAIN CANDIDATE C-SHIFTED BLOCK), obtaining a Discrete Cosine Transformed block and a quantized Discrete Cosine Transformed block (at 1040) (DCT TRANSFORM, QUANTIZE), obtaining a dequantized Discrete Cosine Transformed block and a reconstruction circular-shifted residual block (at 1050) (DEQUANTIZE, INVERSE TRANSFORM), obtaining a reconstruction residual block (at 1060) (INVERSE C-SHIFT), determining a rate-distortion cost (at 1070) (DETERMINE RATE-DISTORTION COST), and outputting (at 1080).

Residual data (residual pixel values, or the residual block) is obtained (at 1010). Obtaining the residual data (at 1010) is similar to obtaining a residual block as shown (at 930) in FIG. 9. The residual block is an N×M block or matrix including (N) rows and (M) columns of residual pixel values.

Determining optimal circular-shift offsets 1000 includes iteratively evaluating available candidate circular-shift offsets (n, m), n=0, . . . , N−1, m=0, . . . , M−1, which includes identifying rate-distortion costs for the available candidate circular-shift offsets, wherein a respective iteration includes obtaining current candidate circular-shift offsets (at 1020) (respective current candidate circular-shift offsets), obtaining a candidate circular-shifted residual block (at 1030), obtaining a Discrete Cosine Transformed block and a quantized Discrete Cosine Transformed block (at 1040), obtaining a dequantized Discrete Cosine Transformed block and a reconstruction circular-shifted residual block (at 1050), obtaining a reconstruction residual block (at 1060), determining a rate-distortion cost (at 1070) (respective rate-distortion costs), as indicated by the broken directional line (at 1075) from determining a rate-distortion cost (at 1070) to obtain current candidate circular-shift offsets (at 1020).

Current candidate circular-shift offsets are obtained (at 1020). The current candidate circular-shift offsets include a current candidate vertical circular-shift offset (n) and a current candidate horizontal circular-shift offset (m). For example, in a first iteration, zero shift candidate circular-shift offsets (n=0, m−0) may be identified as the current candidate circular-shift offsets (n, m). In iterations subsequent to the first iteration, obtaining the current candidate circular-shift offsets (n, m) includes incrementing the current candidate vertical circular-shift offset (n), the current candidate horizontal circular-shift offset (m), or both, wherein, on a condition that the current candidate horizontal circular-shift offset (m) is the maximum column for the residual block (m==M−1), the current candidate vertical circular-shift offset (n) is incremented (n=n+1) and the current candidate horizontal circular-shift offset (m) is circularly incremented to zero (m−0), and wherein, on a condition that the current candidate horizontal circular-shift offset (m) is less than the maximum column for the residual block (m<M−1), incrementing the current candidate vertical circular-shift offset (n) is omitted and the current candidate horizontal circular-shift offset (m) is incremented (m=m+1). The available candidate circular-shift offsets may be evaluated in another order. In some implementations, one or more combinations or pairs of available candidate circular-shift offsets may be evaluated concurrently, or substantially concurrently.

A current candidate circular-shifted residual block is obtained (at 1030) by circular shifting, such as by performing, or applying, a circular shift SHIFT(X, n, m) to, the residual block (X) using the candidate circular-shift offsets, which includes shifting the respective residual pixel values up by the current candidate vertical circular-shift offset (n) rows, wherein values in the top row are circular shifted to the bottom row, and shifting the respective residual pixel values left by the current candidate horizontal circular-shift offset (m) columns, wherein values in the left column are circular shifted to the right column. For simplicity, the current candidate circular-shifted block may be referred to using the notation for performing the circular shift (C-SHIFT(X, n, m)).

A current candidate Discrete Cosine Transformed block (a current candidate transform block) is obtained (at 1040) by performing, or applying, a Discrete Cosine Transform (DCT) to the current candidate circular-shifted block (C-SHIFT(X, n, m)), which may be expressed as DCT(C-SHIFT(X, n, m)). For simplicity, the current candidate Discrete Cosine Transformed block may be referred to using the notation for performing the transform (DCT(C-SHIFT (X, n, m))).

A current candidate quantized Discrete Cosine Transformed block (a current candidate quantized block) is obtained (at 1040) by quantizing the current candidate Discrete Cosine Transformed block (DCT(C-SHIFT(X, n, m))), which may be expressed as Q(DCT(C-SHIFT(X, n, m))). For simplicity, the current candidate quantized Discrete Cosine Transformed block may be referred to using the notation for performing the quantization (Q(DCT(C-SHIFT (X, n, m)))).

A current candidate dequantized Discrete Cosine Transformed block (a current candidate dequantized block) is obtained (at 1050) by dequantizing the current candidate quantized Discrete Cosine Transformed block (Q(DCT(C-SHIFT(X, n, m)))), which may be expressed as InvQ(Q (DCT(C-SHIFT(X, n, m)))). For simplicity, the current candidate dequantized Discrete Cosine Transformed block may be referred to using the notation for performing the dequantization (InvQ(Q(DCT(C-SHIFT(X, n, m))))).

A current candidate reconstruction circular-shifted residual block (a current candidate inverse transformed block) is obtained (at 1050) by performing, or applying, an inverse Discrete Cosine Transform (IDCT) to the current candidate dequantized Discrete Cosine Transformed block (InvQ(Q(DCT(C-SHIFT(X, n, m))))), which may be expressed as IDCT(InvQ(Q(DCT(C-SHIFT(X, n, m))))). For simplicity, the current candidate reconstruction circular-shifted residual block may be referred to using the notation for performing the inverse transform (IDCT(InvQ(Q(DCT (C-SHIFT(X, n, m)).

A current candidate reconstruction residual block (a current candidate reconstructed block) is obtained (at 1060) by applying, or performing, an inverse circular shift using the current candidate circular shift offsets or applying, or performing, the circular shift using the negatives of the current candidate circular shift offsets (C-SHIFT(X,−n,−m)) on the current candidate reconstruction circular-shifted residual block (IDCT(InvQ(Q(DCT(C-SHIFT(X, n, m)))))), which may be expressed as SHIFT(IDCT(InvQ(Q(DCT(SHIFT(X, n, m))))),−n,−m). For simplicity, the current candidate reconstruction residual block may be referred to using the notation for performing the inverse circular shift (SHIFT (IDCT(InvQ(Q(DCT(SHIFT(X, n, m))))),−n,−m)).

A current candidate rate-distortion cost is determined (at 1070). Determining the current candidate rate-distortion cost (at 1070) includes determining a current candidate distortion metric, such as an L2 norm distortion, for the current candidate reconstruction residual block (SHIFT(IDCT(InvQ (Q(DCT(SHIFT(X, n, m))))),−n,−m)) with respect to the residual block (X). For example, the current candidate distortion metric may be a Sum of Absolute Differences (SAD). Other techniques for determining the current candidate distortion metric may be used. For simplicity, the current candidate distortion metric may be expressed as D(n, m).

Determining the current candidate rate-distortion cost (at 1070) includes determining a current candidate rate metric corresponding to, or approximating, entropy encoding the current candidate quantized Discrete Cosine Transformed block (Q(DCT(C-SHIFT(X, n, m)))), such as by identifying a sum of bits from binarizing the coefficients of the candidate quantized Discrete Cosine Transformed block (Q(DCT (C-SHIFT(X, n, m)))) as the current candidate rate metric. For simplicity, the current candidate rate metric may be expressed as R(n, m). Other techniques for estimating, approximating, or calculating the current candidate rate metric may be used.

Determining the current candidate rate-distortion cost (at 1070) includes determining the current candidate rate-distortion cost (Cost(n, m)) for coding the residual block (X) using the current candidate circular-shift offsets (n, m) by combining, or aggregating, the current candidate distortion metric D(n, m) and the current candidate rate metric R(n, m) multiplied by a Lagrange multiplier λ, which may be expressed as Cost(n, m)=D(n, m)+λR(n, m).

Subsequent to determining the current candidate rate-distortion cost (Cost (n, m)) for the available candidate offsets, the circular-shift offsets (n, m) corresponding to the minimal rate-distortion cost (Cost(n, m)) may be identified as the optimal circular-shift offsets (n*, m*) and be output (at 1080).

For some residual blocks, such as residual blocks wherein N=M=8, 16, 32, 64, some available circular-shift offsets (n, m) may be skipped, or omitted from evaluation. For example, for 8×8 blocks, candidate available circular-shift offsets (n, m) where n, m in {0, 2, 4, 6} may be evaluated and circular-shift offsets (n, m) where n, m in {1, 3, 4, 7} may be omitted or skipped. In another example, for 16×16 blocks, candidate available circular-shift offsets (n, m) where n, m in {0, 4, 8, 12} may be evaluated and other circular-shift offsets (n, m) may be omitted or skipped. For N×N blocks, where $N=2^k$, k=2, 3, 4, . . . , candidate available circular-shift offsets (n, m) where n, m in $\{0, 2^{\{k-2\}}, 2^{\{k-1\}}, 2^{\{k\}}\}$ may be evaluated and other circular-shift offsets (n, m) may be omitted or skipped. Skipping, or omitting, some circular-shift offsets (n, m) decreases performance and reduces search complexity and the cost associated with encoding the optimal circular-shift offsets (n*, m*).

Figure 11:
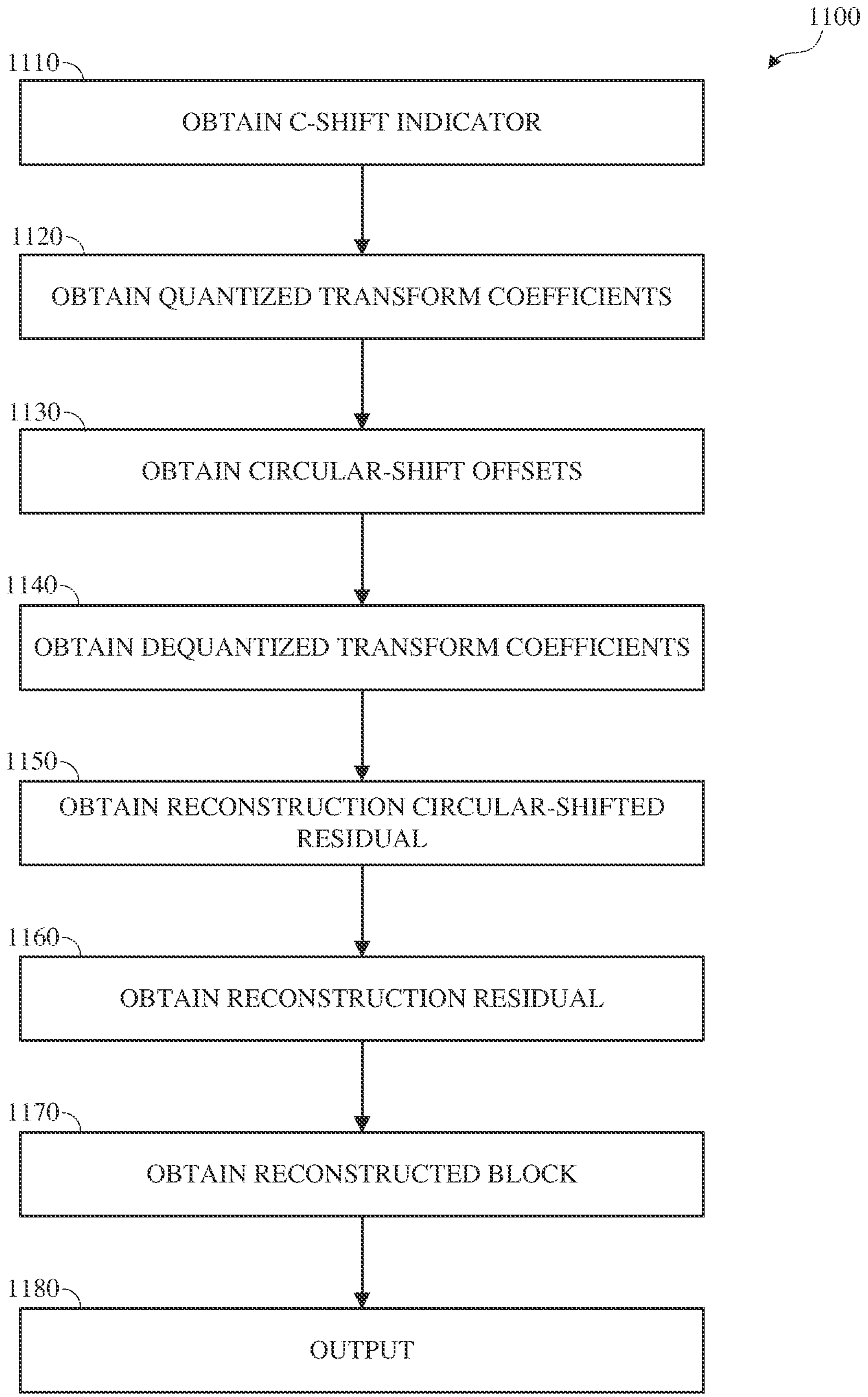
FIG. 11 is a flowchart diagram of an example of decoding using circular-shift transformation in accordance with implementations of this disclosure.

FIG. 11 is a flowchart diagram of an example of decoding using circular-shift transformation 1100 in accordance with implementations of this disclosure. Decoding using circular-shift transformation 1100 may be implemented in a decoder, such as the decoder 800 shown in FIG. 8. Although not expressly shown, decoding using circular-shift transformation 1100 may be performed on a per-channel basis, such as for luminance data and for chrominance data.

Decoding using circular-shift transformation 1100 includes receiving, or otherwise accessing, an encoded, or compressed, bitstream, such as the compressed bitstream 704 shown in FIG. 7 or the compressed bitstream 802 shown in FIG. 8, and decoding the encoded, or compressed, bitstream to generate an output video stream, such as the output video stream 804 shown in FIG. 8.

Decoding using circular-shift transformation 1100 includes generating a reconstructed image. Generating the reconstructed image includes obtaining a circular-shift indicator (at 1110), obtaining quantized transform coefficients (at 1120), obtaining circular-shift offsets (at 1130), obtaining dequantized transform coefficients (at 1140), obtaining reconstruction circular-shifted residual values (at 1150), obtaining reconstruction residual values (at 1160), obtaining reconstructed pixels (at 1170), and outputting the reconstructed image (at 1180).

A circular-shift indicator is obtained (at 1110) by reading, or extracting, the circular-shift indicator from the encoded, or compressed, bitstream. The circular-shift indicator indicates whether circular-shift transformation is enabled for a current block. In some implementations, the circular-shift indicator indicates that circular-shift transformation is disabled for the current block and decoding using circular-shift transformation 1100 may be omitted for the current block. For example, an entropy decoding unit of the decoder, such as the entropy decoding unit 810 shown in FIG. 8, obtains, from the encoded, or compressed, bitstream, data, such as a flag or bit, (a circular-shift indicator) indicating that circular-shift transformation is enabled. The circular-shift indicator may be decoded from the bitstream on a per-video basis, on a per-group of pictures basis, on a per-sequence basis, on a per-frame basis, such as from a frame header, on a per-tile basis, such as from a tile header, on a per-coding unit basis, on a per-slice basis, or on a per-block basis, such as from a block header.

Quantized transform coefficients are obtained (at 1120) by entropy decoding the quantized transform coefficients for the current block from the encoded bitstream. For example, the entropy decoding unit of the decoder obtains the quantized transform coefficients (Q(DCT(SHIFT(X, n*, m*)))) by entropy decoding the quantized transform coefficients (Q(DCT(SHIFT(X, n*, m*)))) from the encoded, or compressed, bitstream, which includes reading, or extracting, entropy coded data from the encoded, or compressed, bitstream.

Circular-shift offsets are obtained (at 1130) for the current block by decoding the circular-shift offsets (n*, m*) from the encoded bitstream. For example, the entropy decoding unit of the decoder obtains, from the encoded, or compressed, bitstream, the circular-shift offsets, which are the optimal circular-shift offsets (n*, m*) identified by the encoder, such as by the encoder 700 shown in FIG. 7. Decoding the optimal circular-shift offsets (n*, m*) from the bitstream may include differentially decoding one or both of the optimal circular-shift offsets (n*, m*). In some implementations, the indication that circular-shift transformation is enabled, or another value or flag included in the bitstream, may indicate a type of shift operation.

In some implementations, expressly decoding the optimal circular-shift offsets (n*, m*) from the bitstream may be omitted and decoding the optimal circular-shift offsets (n*, m*) may include decoding the optimal circular-shift offsets (n*, m*) by reference. For example, a value or flag indicating that circular-shift offsets used for a previously decoded block are used for the current block may be decoded. In some implementations, decoding the circular-shift offsets (n*, m*) from the bitstream may be omitted, and the circular-shift offsets may be identified, or inferred, by the decoder based on context, such as by using previously identified circular-shift offsets (n*, m*), such as circular-shift offsets (n*, m*) identified for a previously decoded block, such as a context block, or a block signaled in the bitstream, using other data from the current decoded block, or by using a combination thereof.

For some transform blocks, such as transform blocks having zero (0) value AC coefficients, other than the (0,0), top left, DC, coefficient, or transform blocks that are uniform in the DCT domain, which have one non-zero value in the spatial domain, the optimal circular shift (C-SHIFT(X, n*, m*)) is equivalent to the quantized transformed circular-shifted by (n*, m*) block, and obtaining the circular-shift offsets 1130 includes determining that the circular-shift offsets are unavailable from the encoded bitstream and otherwise omitting decoding the circular-shift offsets (n*, m*) from the bitstream.

Dequantized transform coefficients are obtained (at 1140) for the current block by dequantizing the quantized transform coefficients. For example, a dequantization unit of the decoder obtains, generates, or calculates, the dequantized transform coefficients (InvQ(Q(DCT(C-SHIFT(X, n*, m*))))) for the current block by dequantizing the quantized transform coefficients (Q(DCT(C-SHIFT(X, n*, m*)))), which may be expressed as InvQ(Q(DCT(C-SHIFT(X, n*, m*)))).

Reconstruction circular-shifted residual values are obtained (at 1150) for the current block by inverse transforming the dequantized transform coefficients. For example, an inverse transform unit of the decoder, such as the inverse transform unit 830 shown in FIG. 8, obtains, generates, or calculates the reconstruction circular-shifted residual values (IDCT(InvQ(Q(DCT(C-SHIFT(X, n*, m*)))))) by applying, or performing, an inverse Discrete Cosine Transform to the dequantized transform coefficients (InvQ(Q(DCT(C-SHIFT(X, n*, m*))))), which may be expressed as IDCT(InvQ(Q(DCT(C-SHIFT(X, n*, m*))))).

Reconstruction residual values are obtained (at 1160) for the current block by inverse shifting the reconstruction circular-shifted residual values. For example, an inverse circular-shift unit of the decoder, such as the inverse circular-shift unit 835 shown in FIG. 8, obtains the reconstruction residual values (SHIFT(IDCT(InvQ(Q(DCT(SHIFT(X, n*, m*))))),−n*,−m*)), by applying, or performing, an inverse optimal circular shift or the optimal circular shift using the negatives of the optimal circular shift offsets, (C-SHIFT(X,−n*,−m*)) on the reconstruction circular-shifted residual values (IDCT(InvQ(Q(DCT(C-SHIFT(X, n*, m*)))))), which may be expressed as SHIFT(IDCT(InvQ(Q(DCT(SHIFT(X, n*, m*))))),−n*,−m*).

For transform blocks for which obtaining the circular-shift offsets (at 1130) includes determining that the circular-shift offsets are unavailable from the encoded bitstream, in response to determining that the circular-shift offsets are unavailable from the encoded bitstream, obtaining the reconstruction residual values (at 1160) includes using the reconstruction circular-shifted residual values as the reconstruction residual values.

Reconstructed pixels (a reconstructed block (X")) are obtained (at 1170). Obtaining the reconstructed pixels (at 1170 includes obtaining, or generating, prediction values (a prediction block) for the current block. For example, generating the prediction block may include generating an intra-prediction block, wherein generating the intra-prediction block includes generating an intra-prediction pixel for the intra-prediction block, such as based on a previously reconstructed pixel value spatially adjacent to the current block. In another example, generating the prediction block may include generating an inter-prediction block, wherein generating the inter-prediction block includes generating an inter-prediction pixel for the inter-prediction block, such as based on a previously reconstructed frame.

Obtaining the reconstructed pixels (at 1170) includes obtaining the reconstructed pixels for the current block by combining the reconstruction residual values (SHIFT(IDCT (InvQ(Q(DCT(SHIFT(X, n*, m*))))),–n*,–m*)) and the prediction values. For example, and intra/inter prediction unit of the decoder, such as the intra/inter prediction unit 840 shown in FIG. 8, generates the prediction values, such as prediction block, for reconstructing the current block, a reconstruction unit, such as the reconstruction unit 850 shown in FIG. 8, combines, such as adds, the prediction block generated by the intra/inter prediction unit to the reconstruction residual block (SHIFT(IDCT(InvQ(Q(DCT (SHIFT(X, n*, m*))))),–n*,–m*)) to obtain decoded values (a decoded block), and a filtering unit of the decoder, such as the filtering unit 860 shown in FIG. 8, filters the decoded block to generate the reconstructed block (X").

The reconstructed block (X") is included in the current reconstructed frame (e.g., the reconstructed pixels are used to form the reconstructed frame) and the reconstructed frame is included in an output video stream, such as the output video stream 804 shown in FIG. 8. The output video stream may be output for presentation to a user, stored, or both.

FIG. 12 is a block diagram of an example for comparison of image and video coding using circular-shift transformation with image and video coding that omits using circular-shift transformation in accordance with implementations of this disclosure. FIG. 12 shows a 4×4 residual block 1210 (X), a Discrete Cosine Transformed block 1220 (Y) corresponding to transforming the residual block 1210 by performing, or applying, a two-dimensional (2D) Discrete Cosine Transform (DCT(X)=Y) to obtain the Discrete Cosine Transformed block 1220 (Y), a circular-shifted residual block 1230 (X') corresponding to performing, or applying, a circular shift using a vertical circular-shift offset (n) of three (n=3) and a horizontal circular-shift offset (m) of two (m=2) to the residual block 1210 (X) (C-SHIFT(X, 3, 2)=X'), and a circular-shifted Discrete Cosine Transformed block 1240 (Y') corresponding to transforming the circular-shifted residual block 1230 (X') by performing, or applying, the two-dimensional (2D) Discrete Cosine Transform (DCT (X')=Y') to obtain the circular-shifted Discrete Cosine Transformed block 1240 (Y').

The (0,0), top-left, DC, coefficient of a Discrete Cosine Transformed block corresponds to the average energy of the input block. Thus, as shown, the (0,0), top-left, DC, coefficient of the circular-shifted Discrete Cosine Transformed block 1240 (Y') is the (0,0), top-left, DC, coefficient of the Discrete Cosine Transformed block 1220 (Y).

The sum of absolute values of the circular-shifted Discrete Cosine Transformed block 1240 (Y') (93.205) is less than the sum of absolute values of the Discrete Cosine Transformed block 1220 (Y) (110.17), indicating that the AC coefficients (other than the DC coefficient) of the circular-shifted Discrete Cosine Transformed block 1240 (Y') are sparse relative to the AC coefficients (other than the DC coefficient) of the Discrete Cosine Transformed block 1220 (Y).

Figure 13:
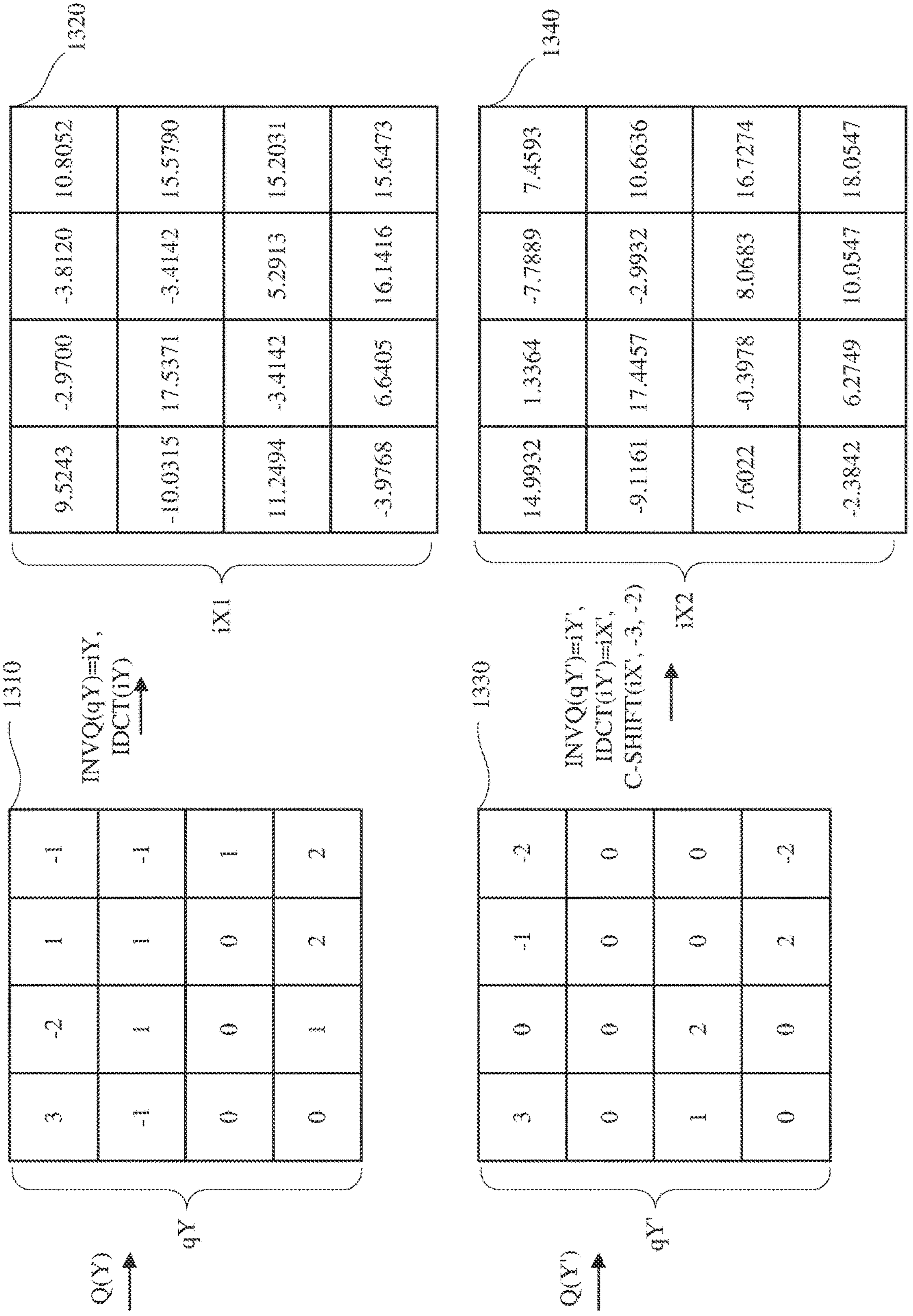
FIG. 13 is another block diagram of the example for comparison of image and video coding using circular-shift transformation with image and video coding that omits using circular-shift transformation in accordance with implementations of this disclosure.

FIG. 13 is another block diagram of the example for comparison of image and video coding using circular-shift transformation with image and video coding that omits using circular-shift transformation in accordance with implementations of this disclosure. FIG. 13 shows a block diagram of an example of a 4×4 quantized Discrete Cosine Transformed block 1310 (qY) corresponding to quantizing the Discrete Cosine Transformed block 1220 (Y) shown in FIG. 12 using a uniform quantizer of step size 8 with a deadzone [–4, 4] (Q(Y)=qY); a first reconstruction residual block 1320 (iX1) corresponding to dequantizing (INVQ) the quantized Discrete Cosine Transformed block 1310 (qY) to obtain a dequantized Discrete Cosine Transformed block (iY) (not shown) (INVQ(qY)=iY), and inverse transforming (IDCT) the dequantized Discrete Cosine Transformed block (iY) to obtain the first reconstruction residual block 1320 (iX1) (IDCT(iY)=iX1); a quantized circular-shifted Discrete Cosine Transformed block 1330 (qY') corresponding to quantizing (Q) the circular-shifted Discrete Cosine Transformed block 1240 (Y') shown in FIG. 12 using the uniform quantizer of step size 8 with the deadzone [–4, 4] (Q(Y')=qY'); and a second reconstruction residual block 1340 (iX2) corresponding to dequantizing (INVQ) the quantized circular-shifted Discrete Cosine Transformed block 1330 (qY') to obtain a dequantized circular-shifted Discrete Cosine Transformed block (iY') (not shown) (INVQ(qY')=iY'), inverse transforming (IDCT) the dequantized circular-shifted Discrete Cosine Transformed block (iY') (not shown) to obtain a reconstruction circular-shifted residual block (iX') (not shown) (IDCT(iY')=iX', and inverse circular shifting (C-SHIFT) the reconstruction circular-shifted residual block (iX') (not shown) to obtain the second reconstruction residual block 1340 (iX2) (C-SHIFT (IX',–3,–2)=iX2).

The quantized circular-shifted Discrete Cosine Transformed block 1330 (qY') is sparse relative to the quantized Discrete Cosine Transformed block 1310 (qY) such that coding, such as entropy coding, of the quantized circular-shifted Discrete Cosine Transformed block 1330 (qY') uses statistically fewer bits than the coding of the quantized Discrete Cosine Transformed block 1310 (qY).

FIG. 14 is another block diagram of the example for comparison of image and video coding using circular-shift transformation with image and video coding that omits using circular-shift transformation in accordance with implementations of this disclosure. FIG. 14 shows a block diagram of an example of distortion 1410 (dX1) between the 4×4 residual block 1210 (X) shown in FIG. 12 and the corresponding first reconstruction residual block 1320 (iX1) shown in FIG. 13 expressed as mean squared errors between the 4×4 residual block 1210 (X) shown in FIG. 12 and the corresponding first reconstruction residual block 1320 (iX1); and distortion 1420 (dX2) between the 4×4 residual block 1210 (X) shown in FIG. 12 and the corresponding second reconstruction residual block 1340 (iX2) shown in FIG. 13 expressed as mean squared errors between the 4×4 residual block 1210 (X) shown in FIG. 12 and the corresponding second reconstruction residual block 1340 (iX2).

The sum of the distortion 1410 (dX1) between the 4×4 residual block 1210 (X) shown in FIG. 12 and the corresponding first reconstruction residual block 1320 (iX1)

shown in FIG. 13 is 94.197. The sum of distortion 1420 between the 4×4 residual block 1210 (X) shown in FIG. 12 and the corresponding second reconstruction residual block 1340 (iX2) shown in FIG. 13 is 76.982. The peak signal to noise ratio (PSNR) of the first reconstruction residual block 1320 (iX1) shown in FIG. 13 is 40.432 dB. The peak signal to noise ratio of the second reconstruction residual block 1340 (iX2) shown in FIG. 13 is 41.308 dB, which is a 0.87 dB improvement relative to the peak signal to noise ratio (PSNR) of the first reconstruction residual block 1320 (iX1) shown in FIG. 13.

For example, the peak signal to noise ratio for one thousand randomly generated 4×4 blocks is 0.22 dB better on average using circular-shifting transformation compared to coding in the absence of circular-shifting transformation, such as using Mode Dependent Directional Transformation, with equivalent compression performance.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described to allow easy understanding of the application are not limiting. On the contrary, the application covers various modifications and equivalent arrangements included within the scope of the appended claims, which scope is to be accorded the broadest interpretation to encompass all such modifications and equivalent structure as is permitted under the law.

What is claimed is:

1. A method comprising:

generating a reconstructed image, wherein generating the reconstructed image includes:

obtaining a circular-shift indicator indicating that circular-shift transformation is enabled for a current block by decoding the circular-shift indicator from an encoded bitstream;

obtaining quantized transform coefficients for the current block by entropy decoding the quantized transform coefficients from the encoded bitstream;

obtaining circular-shift offsets for the current block by decoding the circular-shift offsets from the encoded bitstream;

obtaining dequantized transform coefficients for the current block by dequantizing the quantized transform coefficients;

obtaining reconstruction circular-shifted residual values for the current block by inverse transforming the dequantized transform coefficients;

obtaining reconstruction residual values for the current block by inverse circular shifting the reconstruction circular-shifted residual values in accordance with the circular-shift offsets;

generating prediction values for the current block;

obtaining reconstructed pixels for the current block by combining the reconstruction residual values and the prediction values; and using the reconstructed pixels to form the reconstructed image; and outputting the reconstructed image.

2. The method of claim 1, wherein decoding the circular-shift indicator from the encoded bitstream includes decoding the circular-shift indicator from a block header indicating that whether circular-shift transformation is enabled is signaled on a per-block basis, a tile header indicating that whether circular-shift transformation is enabled is signaled on a per-tile basis, a frame header indicating that whether circular-shift transformation is enabled is signaled on a per-frame basis, or a sequence header indicating that whether circular-shift transformation is enabled is signaled on a per-sequence basis.

3. The method of claim 1, wherein inverse transforming the dequantized transform coefficients includes inverse transforming the dequantized transform coefficients using an inverse Discrete Cosine Transform.

4. The method of claim 1, wherein obtaining circular-shift offsets includes obtaining a vertical circular-shift offset and a horizontal circular-shift offset.

5. The method of claim 4, wherein inverse circular shifting includes:

circular shifting the reconstruction circular-shifted residual values down rows by the vertical circular-shift offset; and circular shifting the reconstruction circular-shifted residual values right by columns by the horizontal circular-shift offset.

6. The method of claim 1, wherein:

decoding the circular-shift offsets from the encoded bitstream includes determining that the circular-shift offsets are unavailable from the encoded bitstream; and in response to determining that the circular-shift offsets are unavailable from the encoded bitstream, inverse circular shifting the reconstruction circular-shifted residual values includes using the reconstruction circular-shifted residual values as the reconstruction residual values.

7. A method comprising:

obtaining a current block from a current input frame;

generating a prediction block for the current block;

obtaining a residual block by subtracting the prediction block from the current block;

obtaining optimal circular-shift offsets by performing circular-shift optimization for the residual block, wherein circular-shift optimization includes:

obtaining a circular-shifted residual block by circular shifting the residual block in accordance with the optimal circular-shift offsets;

obtaining a transform block by Discrete Cosine Transforming the circular-shifted residual block; and obtaining a quantized block by quantizing the transform block;

obtaining entropy coded data by entropy coding the quantized block;

including the entropy coded data in an output bitstream; and outputting the output bitstream.

8. The method of claim 7, wherein including the entropy coded data in the output bitstream includes including data representing the optimal circular-shift offsets in the output bitstream.

9. The method of claim 7, wherein including the entropy coded data in the output bitstream includes including a circular-shift indicator indicating that circular-shift transformation is enabled for a current block in the output bitstream.

10. The method of claim 7, wherein generating the prediction block for the current block includes generating an intra-prediction block, wherein generating the intra-prediction block includes generating an intra-prediction pixel for the intra-prediction block based on a previously reconstructed pixel value spatially adjacent to the current block.

11. The method of claim 7, wherein circular-shift optimization includes:

identifying rate-distortion costs for a plurality of candidate circular-shift offsets, wherein, for respective current candidate circular-shift offsets from the plurality of candidate circular-shift offsets, identifying a respective rate-distortion cost includes:

obtaining current candidate circular-shift offsets;

obtaining a current candidate circular-shifted residual block by circular shifting the residual block in accordance with the current candidate circular-shift offsets;

obtaining a current candidate transform block by Discrete Cosine Transforming the current candidate circular-shifted residual block;

obtaining a current candidate quantized block by quantizing the current candidate transform block;

obtaining a current candidate dequantized Discrete Cosine Transformed block by dequantizing the current candidate quantized block;

obtaining a current candidate reconstruction circular-shifted residual block by inverse transforming the current candidate dequantized Discrete Cosine Transformed block;

obtaining a current candidate reconstructed block by inverse circular shifting the current candidate reconstruction circular-shifted residual block in accordance with the current candidate circular-shift offsets; and determining the respective rate-distortion cost for the current candidate circular-shift offsets based on a difference between the current candidate reconstructed block and the residual block; and identifying candidate circular-shift offsets from the plurality of candidate circular-shift offsets corresponding to a minimal rate-distortion cost as the optimal circular-shift offsets.

12. The method of claim 11, wherein the residual block is a N×M block and wherein the plurality of candidate circular-shift offsets includes N×M candidate circular-shift offsets.

13. The method of claim 11, wherein the current candidate circular-shift offsets include a current candidate vertical circular-shift offset and a current candidate horizontal circular-shift offset.

14. The method of claim 13, wherein:

the residual block includes residual pixel values; and circular shifting the residual block in accordance with the current candidate circular-shift offsets includes:

circular shifting the residual pixel values up rows by the current candidate vertical circular-shift offset; and circular shifting the residual pixel values left columns by the current candidate horizontal circular-shift offset.

15. An apparatus, comprising:

a non-transitory computer-readable medium; and a processor configured to execute instructions stored on the non-transitory computer-readable medium to:

generate a reconstructed image, wherein, to generate the reconstructed image, the processor is configured to execute the instructions to:

obtain a circular-shift indicator indicating that circular-shift transformation is enabled for a current block by decoding the circular-shift indicator from an encoded bitstream;

obtain quantized transform coefficients for the current block, wherein, to obtain the quantized transform coefficients for the current block, the processor is configured to execute the instructions to entropy decode the quantized transform coefficients from the encoded bitstream;

obtain circular-shift offsets for the current block, wherein, to obtain the circular-shift offsets for the current block, the processor is configured to execute the instructions to decode the circular-shift offsets from the encoded bitstream;

obtain dequantized transform coefficients for the current block, wherein, to obtain the dequantized transform coefficients for the current block, the processor is configured to execute the instructions to dequantize the quantized transform coefficients;

obtain reconstruction circular-shifted residual values for the current block, wherein, to obtain the reconstruction circular-shifted residual values for the current block, the processor is configured to execute the instructions to inverse transform the dequantized transform coefficients;

obtain reconstruction residual values for the current block, wherein, to obtain the reconstruction residual values for the current block, the processor is configured to execute the instructions to inverse circular shift the reconstruction circular-shifted residual values;

generate prediction values for the current block;

obtain reconstructed pixels for the current block, wherein, to obtain the reconstructed pixels for the current block, the processor is configured to execute the instructions to combine the reconstruction residual values and the prediction values; and use the reconstructed pixels to form the reconstructed image; and output the reconstructed image.

16. The apparatus of claim 15, wherein, to decode the circular-shift indicator from the encoded bitstream, the processor is configured to execute the instructions to decode the circular-shift indicator from a block header indicating that whether circular-shift transformation is enabled is signaled on a per-block basis, a tile header indicating that whether circular-shift transformation is enabled is signaled on a per-tile basis, a frame header indicating that whether circular-shift transformation is enabled is signaled on a per-frame basis, or a sequence header indicating that whether circular-shift transformation is enabled is signaled on a per-sequence basis.

17. The apparatus of claim 15, wherein, to inverse transform the dequantized transform coefficients, the processor is configured to execute the instructions to inverse transform the dequantized transform coefficients using an inverse Discrete Cosine Transform.

18. The apparatus of claim 15, wherein, to obtain circular-shift offsets, the processor is configured to execute the instructions to obtain a vertical circular-shift offset and a horizontal circular-shift offset.

19. The apparatus of claim 18, wherein, to inverse circular shift, the processor is configured to execute the instructions to:

circular shift the reconstruction circular-shifted residual values down rows by the vertical circular-shift offset; and circular shift the reconstruction circular-shifted residual values right columns by the horizontal circular-shift offset.

20. The apparatus of claim 15, wherein:

to decode the circular-shift offsets from the encoded bitstream, the processor is configured to execute the instructions to determine that the circular-shift offsets are unavailable from the encoded bitstream; and in response to a determination that the circular-shift offsets are unavailable from the encoded bitstream, the processor is configured to execute the instructions to inverse circular shift the reconstruction circular-shifted residual values by using the reconstruction circular-shifted residual values as the reconstruction residual values.

* * * * *